(12) United States Patent
Wang et al.

(10) Patent No.: US 8,498,208 B2
(45) Date of Patent: Jul. 30, 2013

(54) TURNING ON FLOWS IN NETWORK INITIATED QOS

(75) Inventors: Jun Wang, San Diego, CA (US); George Cherian, San Diego, CA (US); Srinivasan Balasubramanian, San Diego, CA (US); Haipeng Jin, Carlsbad, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 12/839,335

(22) Filed: Jul. 19, 2010

(65) Prior Publication Data

US 2011/0170411 A1 Jul. 14, 2011

Related U.S. Application Data

(60) Provisional application No. 61/262,882, filed on Nov. 19, 2009, provisional application No. 61/252,356, filed on Oct. 16, 2009, provisional application No. 61/226,978, filed on Jul. 20, 2009.

(51) Int. Cl.
*H04L 12/26* (2006.01)

(52) U.S. Cl.
USPC .................................... 370/235; 370/252

(58) Field of Classification Search
USPC ... 370/229–235, 315, 252, 253, 331; 709/238
See application file for complete search history.

(56) References Cited

U.S. PATENT DOCUMENTS

| | | | |
|---|---|---|---|
| 2001/0027490 | A1 | 10/2001 | Fodor et al. |
| 2002/0024941 | A1* | 2/2002 | Lee et al. ................... 370/331 |
| 2006/0025148 | A1* | 2/2006 | Karaoguz et al. .......... 455/452.2 |
| 2009/0034451 | A1* | 2/2009 | Warrier ......................... 370/328 |
| 2009/0190471 | A1* | 7/2009 | Mahendran et al. ....... 370/230.1 |

FOREIGN PATENT DOCUMENTS

WO WO2009089455 7/2009

OTHER PUBLICATIONS

3GPP2: "E-UTRAN—eHRPD Connectivity and Interworking: Core Network Aspects, X.S0057-0 v1.4", Jul. 2, 2009, XP002623115, Retrieved from the Internet : URL :http://ftp.3gpp2.org/TSGX/Working/2009 /2009-07-Seoul /TSG-X-2009-07-Seoul/WG5-PDS /20090715%20-%20X. S0057-0%20v2.0%20-%20Te1 econf /X .P0057-0%20v1. 4%20E-UTRAN-eHRPD%201 nterworking%20(marked). zip paragraphs [005.]-[5.5.4.1.2.], [10.11]; figure 23.

3rd Generation Partnership Project; Technical Specification Group Services and System Aspects; Policy and charging control architecture (Release 9), 3GPP Standard; 3GPP TS 23.203, 3rd Generation Partnership Project (3GPP), Mobile Competence Centre; 650, Route Des Lucioles; F-06921 Sophia-Antipolis Cedex France, No. v9.1.0, Jun. 1, 2009, pp. 1-116, XP050363031, paragraphs [006.]-[6.1.5].

(Continued)

*Primary Examiner* — Gary Mui
(74) *Attorney, Agent, or Firm* — Kristine U. Ekwueme

(57) ABSTRACT

Methods and apparatus for network pre-configuration of Quality of Service (QoS) parameters in a communication channel triggered by establishment of packet data access by an access terminal with the network. The network-determined and network-initiated pre-establishment of the QoS parameters are for one or more reservation links, which each relate to a corresponding one or more applications resident on the access terminal.

66 Claims, 17 Drawing Sheets

OTHER PUBLICATIONS

"3rd Generation Partnership Project; Technical Specification Group Services and System Aspects; GPRS enhancements for E-URAN access; Release 8", 3GPP Standard; 3GPP TS 23.401, 3rd Generation Partnership Project (3GPP), Mobile Competence Centre; 650, Route Des Lucioles; F-06921 Sophia-Antipolis Cedex; France, No. V0.5.1, May 1, 2007, pp. 1-50, XP050363647, paragraphs 104.61—[4.6.2], [5.3.2]-[5.3.4].

3rd Generation Partnership Project; Technical Specification Group Services and System Aspects; General Packet Radio Service (GPRS); Service description; Stage 2 (Release 9), 3GPP Standard; 3GPP TS 23.060, 3rd Generation Partnership Project (3GPP), Mobile Competence Centre; 650, Route Des Lucioles; F-06921 Sophia-Antipolis Cedex; France, No. V9.1.1, Jun. 1, 2009, pp. 1-283, XP050362330, paragraphs [6.12]-[6.12.1A]; figures 50,50a.

International Search Report and Written Opinion—PCT/US2010/042660—ISA/EPO—Jul. 27, 2011.

Qualcomm Inc: "PCC Support for cdma2000", Jun. 15, 2009, XP002623117, Retrieved from the Internet : URL :http://ftp.3gpp2.org/TSGX/Working/2009/2009-06-Newport Beach/TSG-X-2009-06-Newport Beach/WG5-PDS/X50-20090615-015%20r2%20QC0M%20QoS%20PCC%20interactions%20in%20cdma2000. ppt p. 8.

ZTE: "Annex F.x MS Initiated QoS Update with PCC in X.P0011-004-E.", i Jun. 5, 2009, XP002623116, Retrieved from the Internet:URL:ftp://ftp.3gpp2.org/TSGX/Working/2009/2009-06-Newport Beach/TSG-X-2009-06-Newport Beach/WG5-PDS/X50-20090615-017%20ZTE%20UE%20Initiated%20QoS%20Update%20to%20Support%20PCC-6. doc paragraph [OF.x]; figures F-1.

\* cited by examiner

TURNING ON FLOWS IN NETWORK INITIATED QOS

CLAIM OF PRIORITY UNDER 35 U.S.C. 517 119

The present application for patent claims priority to Provisional Application No. 61/226,978 entitled "Method and Apparatus for Turning on Flows in Network Initiated QoS" filed 20 Jul. 2009, and assigned to the assignee hereof and hereby expressly incorporated by reference herein.

The present application for patent claims priority to Provisional Application No. 61/252,356 entitled "MS Initiated QoS in HRPD with PCC Architecture" filed 16 Oct. 2009, and assigned to the assignee hereof and hereby expressly incorporated by reference herein.

The present application for patent claims priority to Provisional Application No. 61/262,882 entitled "Method and Apparatus to Turn on Reservation for Network Initiated QoS in eHRPD and HRPD" filed 19 Nov. 2009, and assigned to the assignee hereof and hereby expressly incorporated by reference herein.

BACKGROUND

1. Field

The present disclosure relates generally to communication, and more specifically to techniques for packet data Quality of Service and activating reservation links in a wireless communication network.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1x, CDMA2000 and CDMA2000 (e)HRPD different revisions. All are approved radio interfaces for the ITU's IMT-2000. CDMA2000 has a relatively long technical history and is backward-compatible with its previous 2G iteration IS-95 (cdmaOne).

CDMA2000 1x (IS-2000), also known as 1x and 1xRTT, is the core CDMA2000 wireless air interface standard. The designation "1x", meaning 1 times Radio Transmission Technology, indicates the same RF bandwidth as IS-95: a duplex pair of 1.25 MHz radio channels. 1xRTT almost doubles the capacity of IS-95 by adding 64 more traffic channels to the forward link, orthogonal to (in quadrature with) the original set of 64. The 1x standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1xEV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

With further reference to 1xEV-DO (EV-DO) as part of a family of CDMA2000 1x digital wireless standards, 1xEV-DO is a "3G" CDMA standard. EV-DO originally stood for "EVolution, Data-Only", but recently is also referred to as "EVolution, Data-Optimized". EV-DO provides data rates over 10 times faster than 1xRTT, the previous data technology for CDMA networks. Unlike other "1x" standards, EV-DO only addresses data—not voice. It requires a dedicated slice of spectrum, separate from voice networks using standards such as 1xRTT. There are currently two main versions of 1xEV-DO: "Release 0" and "Revision A". Release 0 is the original version, and the first to be widely deployed. Rel. 0 offers data rates up to 2.4 mbps, averaging 300-600 kbps in the real world. This is much faster than the 50-80 kbps typically offered by 1xRTT technology. Rel. 0 data rates are identical to 1xEV-DV Revision C. Revision A integrates most of the faster data technology from 1xEV-DV Revision D, and improves latency. These enhancements allow features such as VoIP and video calling. Although EV-DO does not include voice capability natively, Rev. A is fast enough to support VoIP technology at service levels equal or better to 1xRTT voice technology. This may be a future upgrade path for CDMA carriers if EV-DV development remains stalled. In terms of data speed and general technology evolution, the closest equivalent to EVDO for GSM/WCDMA networks would be HSDPA. 1xEV-DO is based on a technology initially known as "HDR" (High Data Rate) or "HRPD" (High Rate Packet Data), developed by Qualcomm. The international standard is known as IS-856.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided that is operable by a network in configuring quality of service (QoS) for an access terminal. A network receives a request for packet data access from an access terminal. The network determines based on establishment of the packet data access a QoS policy configuration corresponding to an application on the access terminal. The network establishes the reservation link with the access terminal separately from the QoS policy configuration. The network initiates activation of the reservation link.

In another aspect, at least one processor operable by a network in configuring QoS for an access terminal. A first module receives, at a network, a request for packet data access from an access terminal. A second module determines, by the network and based on establishment of the packet data access, a QoS policy configuration corresponding to an application on the access terminal. A third module establishes the reservation link with the access terminal separately from the QoS policy configuration. A fourth module initiates activation of the reservation link.

In an additional aspect, a computer program product is provided that is operable by a network in configuring QoS for an access terminal. A non-transitory computer-readable medium stores sets of code. A first set of code causes a computer to receive, at a network, a request for packet data access from an access terminal. A second set of code causes the computer to determine, by the network and based on establishment of the packet data access, a QoS policy configuration corresponding to an application on the access terminal. A third set of code causes the computer to establish the reservation link with the access terminal separately from the QoS policy configuration. A fourth set of code causes the computer to initiate activation of the reservation link.

In a further aspect, an apparatus is provided that is operable by a network in configuring QoS for an access terminal. The apparatus comprises means for receiving, at a network, a request for packet data access from an access terminal. The apparatus comprises means for determining, by the network and based on establishment of the packet data access, a QoS policy configuration corresponding to an application on the access terminal. The apparatus comprises means for establishing the reservation link with the access terminal separately from the QoS policy configuration. The apparatus comprises means for initiating activation of the reservation link.

In yet a further aspect, an apparatus is provided that is operable by a network in configuring QoS for an access terminal. A transceiver receives, at a network, a request for packet data access from an access terminal. A computing platform determines, by the network and based on establishment of the packet data access, a QoS policy configuration corresponding to an application on the access terminal. A network interface establishes the reservation link with the access terminal separately from the QoS policy configuration. The transceiver further initiates activation of the reservation link.

In one aspect, a method is provided that is operable by an access terminal in requesting QoS. The access terminal transmits to a network, a request for packet data access from an access terminal to prompt the network to determine based on establishment of the packet data access a QoS policy configuration corresponding to an application on the access terminal. The access terminal establishes the reservation link with the network separately from the QoS policy configuration. The access terminal initiates activation of the reservation link.

In another aspect, at least one processor is provided that is operable by an access terminal in requesting QoS. A first module transmits to a network, a request for packet data access from an access terminal to prompt the network to determine based on establishment of the packet data access a QoS policy configuration corresponding to an application on the access terminal. A second module establishes the reservation link with the network separately from the QoS policy configuration. A third module initiates activation of the reservation link.

In an additional aspect, a computer program product is provided that is operable by an access terminal in requesting QoS. A non-transitory computer-readable medium stores sets of codes comprising: A first set of codes causes a computer to transmit to a network, a request for packet data access from an access terminal to prompt the network to determine based on establishment of the packet data access a QoS policy configuration corresponding to an application on the access terminal. A second set of codes causes the computer to establish the reservation link with the network separately from the QoS policy configuration. A third set of codes causes the computer to initiate activation of the reservation link.

In a further aspect, an apparatus is provided that is operable by an access terminal in requesting QoS. The apparatus comprises means for transmitting to a network, a request for packet data access from an access terminal to prompt the network to determine based on establishment of the packet data access a QoS policy configuration corresponding to an application on the access terminal. The apparatus comprises means for establishing the reservation link with the network separately from the QoS policy configuration. The apparatus comprises means for initiating activation of the reservation link.

In another additional aspect, an apparatus is provided that is operable by an access terminal in requesting QoS. A transceiver transmits to a network, a request for packet data access from an access terminal to prompt the network to determine based on establishment of the packet data access a QoS policy configuration corresponding to an application on the access terminal. A computing platform via the transceiver establishes the reservation link with the network separately from the QoS policy configuration and initiates activation of the reservation link.

In a further aspect, a method is provided that is operable by an access terminal in requesting QoS. The access terminal transmits a request for packet data access to an access network. The access terminal establishes a reservation link with a network via the access network that is associated with a QoS policy configuration. The access terminal initiates activation of the reservation link by the access terminal in response to detecting activity on the reservation link.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The described aspects include methods and apparatus for network pre-configuration of Quality of Service (QoS) parameters in a communication channel triggered by establishment of packet data access by an access terminal with the network. The network-determined and network-initiated pre-establishment of the QoS parameters are for one or more reservation links, which each relate to a corresponding one or more applications resident on the access terminal. Further, the QoS parameters established based upon establishment of the packet data access are based on QoS-related information stored in the network and applied to the given access scenario. Additionally, after establishment, the one or more reservation links may be turned on or off by either the network or by the access terminal. Thus, the described aspects improve the efficiency in setting up a call once the corresponding application on the access terminal is initiated.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Turning on Flows in the Network (NW) Initiated Quality of Service (QoS):

It should be appreciated with the benefit of the present disclosure that network (NW)-initiated Quality of Service (QoS) is introduced in HRPD (High Rate Packet Data); however, turning on the reservation has not been addressed. The present innovation discloses certain methods for turning on flows in network-initiated QoS, including Access Terminal (AT) based, Network based, and AT/Network based.

As a high-level overview of the innovative methods to turn on flow, first AT based methodology can entail that the AT always initiates ReservationOn (both forward and reverse) whenever a new NW-initiated flow is setup by the network. AT initiates Reservation-On (both forward and reverse), whenever there is a data-activity detected on the link.

Second, for a Network based methodology, an Access Node (AN) always initiates ReservationOn (both forward and reverse) whenever a new reservation is requested by the AT, which is equivalent to the AT always turning on the reservation. The AN initiates ReservationOn (both forward and reverse) based on an indication from HRPD Serving Gateway (HSGW).

Third, for an AT/Network based methodology, the AT turns on the Reverse-Reservation if the AT has data to send.

Fourth, AN turns on the Fwd-Reservation if AN has data to send.

Figure 1:
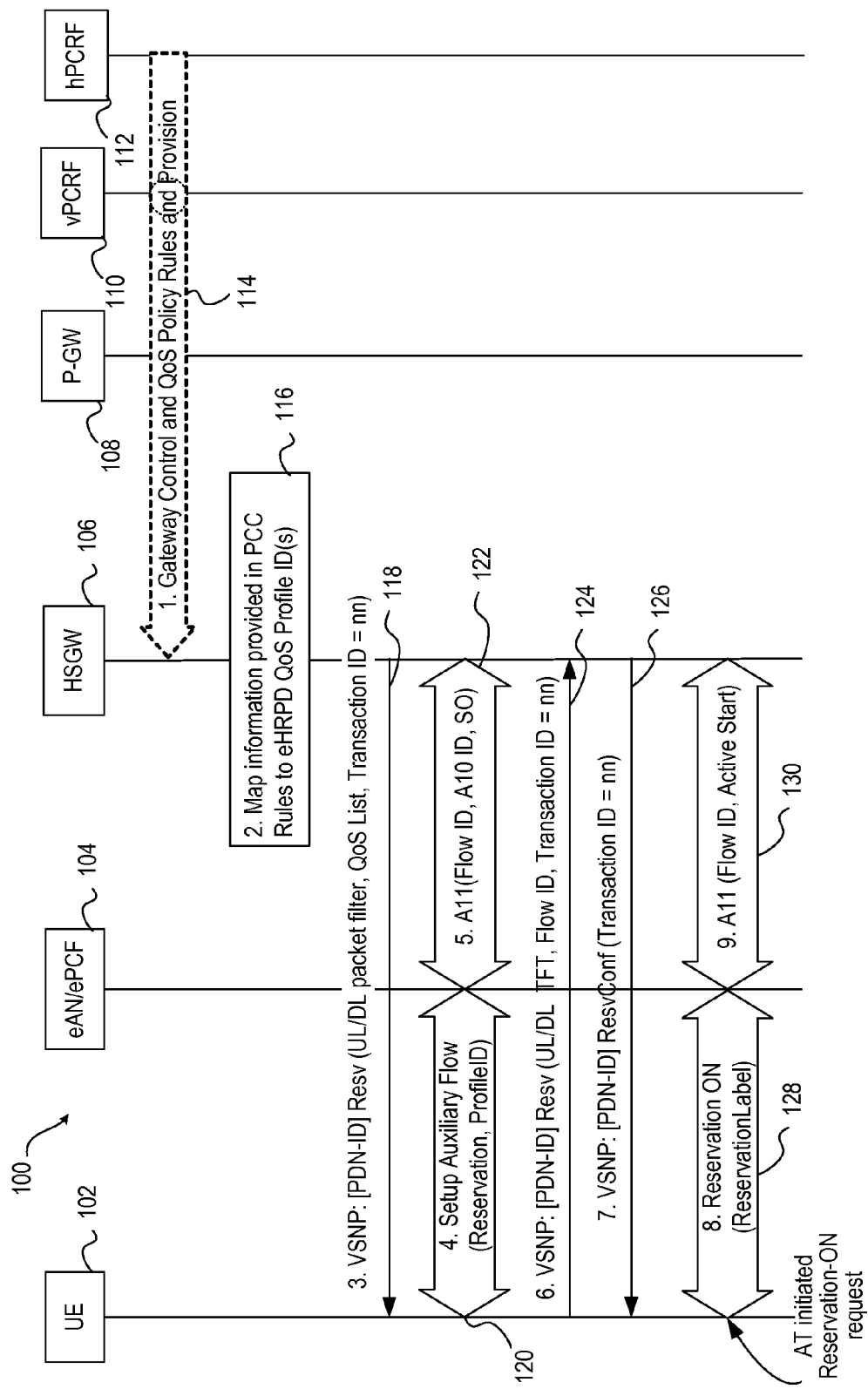
FIG. 1 illustrates a call flow for an Access Terminal-initiated Reservation-ON to turn on packet flows.

With continued reference to the Drawings, in FIG. 1, an exemplary methodology 100 for AT initiated Reservation-ON provides for AT based solutions to turn on flows. An AT, depicted as User Equipment (UE) 102, communicates with an evolved Access Network (eAN)/evolved Packet Control Function (ePCF) 104 that in turn communicates to an HSGW 106, P-GW (Packet Data Network (PDN) Gateway) 108, a visited (PCRF) 110, and home PCRF (hPCRF) 112. At step 1, gateway control and QoS policy rules and provision are sent from hPCRF or vPCRF 112 to HSGW 106 (block 114). At step 2, the HSGW 106 maps information provided in PCC rules to eHRPD QoS FlowProfile ID(s) (block 116). Then, in step 3 the HSGW 106 communicates Vendor Specific Network Protocol (VSNP): [PDN-ID] Resv (UL/DL packet filter, QoS List, Transaction ID=nn) to UE 102 (block 118). At step 4, setup of auxiliary flow (reservation, FlowProfileID) is performed between the UE 102 and eAN/ePCF 104 (block 120). At step 5, A11 (Flow ID, A10 ID, SO) is performed between the HSGW 106 and eAN/ePCF 104 (block 122). At step 6, VSNP: [PDN-ID] resv (UL/DL TFT, Flow ID, Transaction ID=nn) is communicated from UE 102 to HSGW 106 (block 124). In step 7, the HSGW 106 responds with VSNP: [PDN-ID] ResvConf (Transaction ID=nn) to the UE 102 (block 126). Thus, at step 8, the AT-initiated Reservation-ON request is performed, depicted as Reservation ON (ReservationLabel) communicated between UE 102 and eAN/ePCF 104 (block 128). At step 9, A11 (Flow ID, Active Start) is communicated between eAN/ePCF 104 and HSGW 106 (block 130).

In one aspect, AT always initiates Reservation-On whenever a new flow is setup by the network. In some cases, if AT knows it is only unidirectional data, and then the AT can opt to turn on the corresponding direction only. Issues are contemplated with this solution. One of the issues is that the packet filters and QoS for the corresponding flows cannot be 'pre-setup' and then be activated later. In the case of inter-RAT (Radio Access Technology) handoff, all the QoS will become NW initiated QoS, but, it is not desirable to turn on all the flows.

In another aspect, AT initiates forward link Reservation-On whenever there is a data-activity detected on the forward link. This can present an issue that the first several forward link packets on forward link may lose QoS treatment.

In an additional aspect, turning on flows can occur during LTE→eHRPD handoff. In the case of inter-RAT handoff, all the QoS will be setup by network as the NW if Bearer Control Mode (BCM) indicates that the UE and serving NW supports NW initiated QoS, but it is not desirable to turn on all the flows.

Potential solutions to the aforementioned issues are disclosed.

First, during inter-RAT handoff, only the flows that are currently 'active' on the source-RAT at the time of handoff is setup on the target-RAT.

Second, network sets up QoS only for a network-initiated QoS. UE-initiated QoS is not setup by the network during inter-RAT handoff. The UE will setup the UE-initiated QoS.

Third, usage of global filter-ID is used by dividing the global filter-ID space into two, one for UE initiated QoS and the other one for NW-initiated QoS.

Fourth, AT can do packet-filter match when the QoS is pushed by the network to the UE.

Returning to the second methodology for AN based solutions to turn on Reservation, AN turns on the reservation based on an indication from HSGW. To that end, a new indication is added to A11 signaling to turn on a reservation. The indication can be to turn on both Reverse/Forward or just Forward Reservation. The HSGW knows when to send the indication to AN when the HSGW detects a down-link packet matching a reservation. Then HSGW can send the indication to AN. The HSGW has to keep track of reservation state, which can be a complex solution. HSGW turns on both Forward/Reverse Reservations whenever PCRF sets-up the flow. HSGW turns off both Forward/Reverse Reservations when PCRF deletes the flow.

In this model, the HSGW caches the flows that are in OFF state, even though the flow does not exist at a gateway control session. HSGW can delete the flow based on a "Flow inactivity timer". HSGW can turn on/off the flow based on Gate-ON/OFF indications from PCRF, which would require changes on 3GPP standard.

Figure 2:
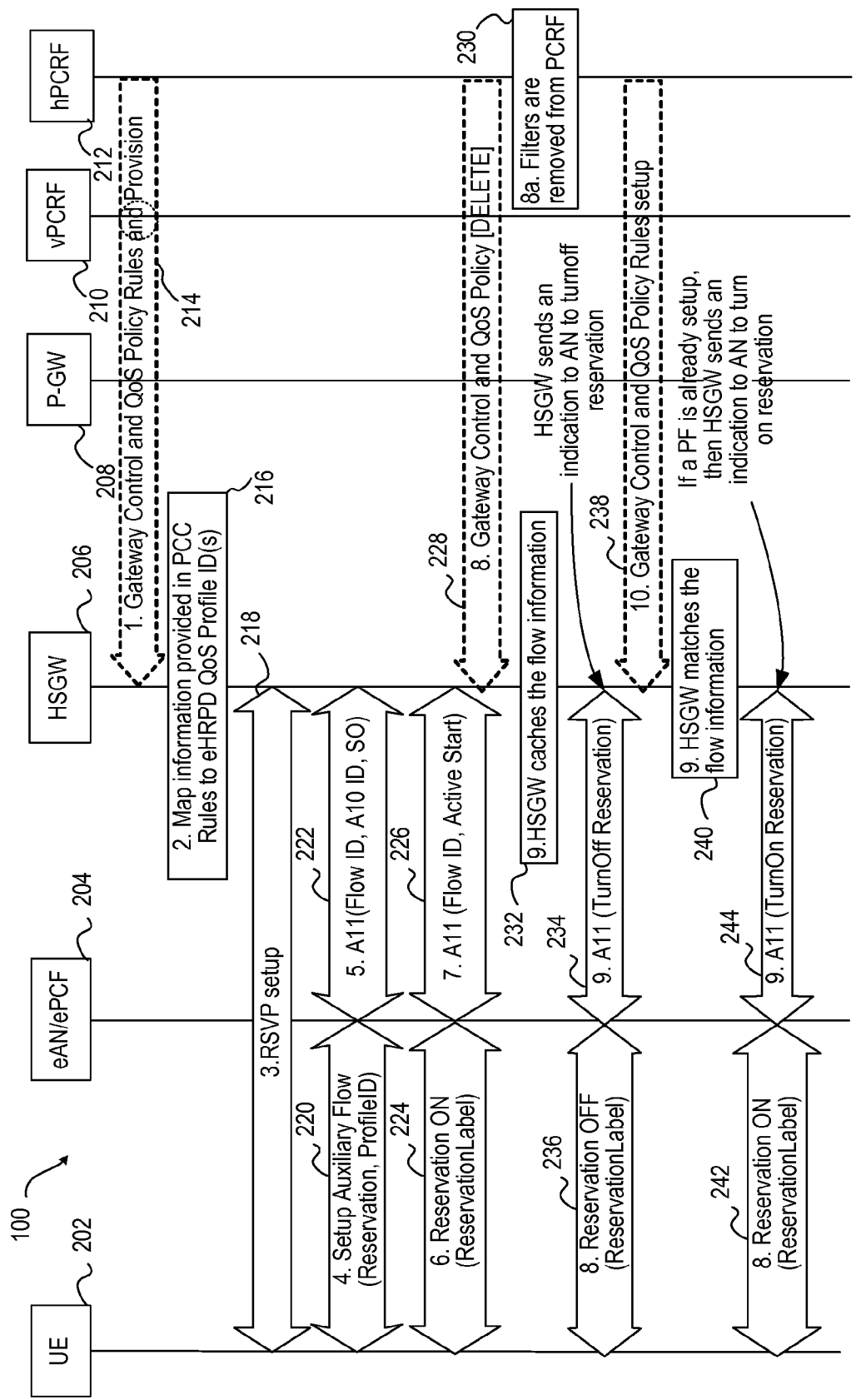
FIG. 2 illustrates a call flow for an Access Network-initiated Reservation-ON to turn on packet flows based on HRPD Serving Gateway (HSGW) signaling.

FIG. 2 depicts an exemplary call flow 200 for HSGW signaling to AN for AN based solutions to turn on flows. An AT, depicted as User Equipment (UE) 202, communicates with an eAN/ePCF 204 that in turn communicates to an HSGW 206, P-GW 208, a vPCRF 210, and hPCRF 212. At step 1, gateway control and QoS policy rules and provision are sent from hPCRF 212 to HSGW 206 (block 214). At step 2, the HSGW 206 maps information provided in PCC rules to eHRPD QoS Profile ID(s) (block 216). Then, in step 3 UE 202 and HSGW 206 performs RSVP (ReSerVation Protocol) setup (block 218). At step 4, setup of auxiliary flow (reservation, profileID) is performed between the UE 202 and eAN/ePCF 204 (block 220). At step 5, A11 (Flow ID, A10 ID, SO) is performed between the HSGW 206 and eAN/ePCF 204 (block 222). At step 6, Reservation ON (ReservationLabel) is coordinated between UE 202 and eAN/ePCF 204 (block 224). In step 7, the A11 (Flow ID, Active Start) is coordinated between eAN/ePCF 204 and HSGW 206 (block 226). At step 8, the hPCRF 212 communicates Gateway Control and QoS Policy [DELETE] to HSGW 206 (block 228). At step 8a, the hPCRF 212 removes filters from PCRF (block 230). At step 9, the HSGW 206 caches the flow information including PF and QoS (block 232). This allows the state between UE and the HSGW to be synced when the PF/QoS is removed from the PCRF. In step 8, the eAN/ePCF 204 communicates Reservation OFF (ReservationLabel) to the UE 202 (block 234). In step 9, via A11 (Turn Off Reservation), the HSGW 206 sends an indication to the eAN/ePCF 204 to turn off reservation (block 236). Then the eAN/ePCF sends indication to the UE to turn off the reservation. Subsequently at step 10, the hPCRF 212 communicates Gateway Control and QoS Policy Rules setup to HSGW 206 (block 238). The HSGW 206 matches the flow information (block 240). If a packet filter (PF) is already setup (cached in the step 9), then the HSGW 206 sends an indication to eAN/ePCF 204 to turn on reservation via A11 interface (block 242), which in turn communicates Reservation ON (ReservationLabel) with UE 202 (block 244).

The Resource Reservation Protocol (RSVP) is a Transport Layer protocol designed to reserve resources across a network for an integrated services Internet. RSVP operates over an IPv4 or IPv6 Internet Layer and provides receiver-initiated setup of resource reservations for multicast or unicast data flows with scaling and robustness. It does not transport application data but is similar to a control protocol, like ICMP, IGMP. RSVP is described in RFC 2205. RSVP can be used by either hosts or routers to request or deliver specific levels of quality of service (QoS) for application data streams or flows. RSVP defines how applications place reservations and how they can relinquish the reserved resources once the need for them has ended. RSVP operation will generally result in resources being reserved in each node along a path.

Thus, currently on LTE, the PCRF sets up packet filter and QoS on a demand basis (e.g., application requesting activation and deactivation of QoS]. As a first option, the innovation provides following a model similar or identical to eHRPD wherein the AT always turns on the flow whenever a NW initiated QoS is setup. As a second option, the "pre-setup" of the flow is allowed with turn-on/off of the flows being based on real usage. To that end, HSGW and UE need to cache the flow even when the flow does not exist in the gateway control session. If there is a cached flow, then the HSGW translates the "setting up of flow" at the gateway control session to a new indication to "turn on the flow" to the AN.

In an exemplary aspect, pre-setup is illustrated in steps 2-14 of FIG. 14 described below. UE sets up the QoS flow before even being requested by an application to activate the QoS.

PCC Call Flows for CDMA2000.

Figure 3:
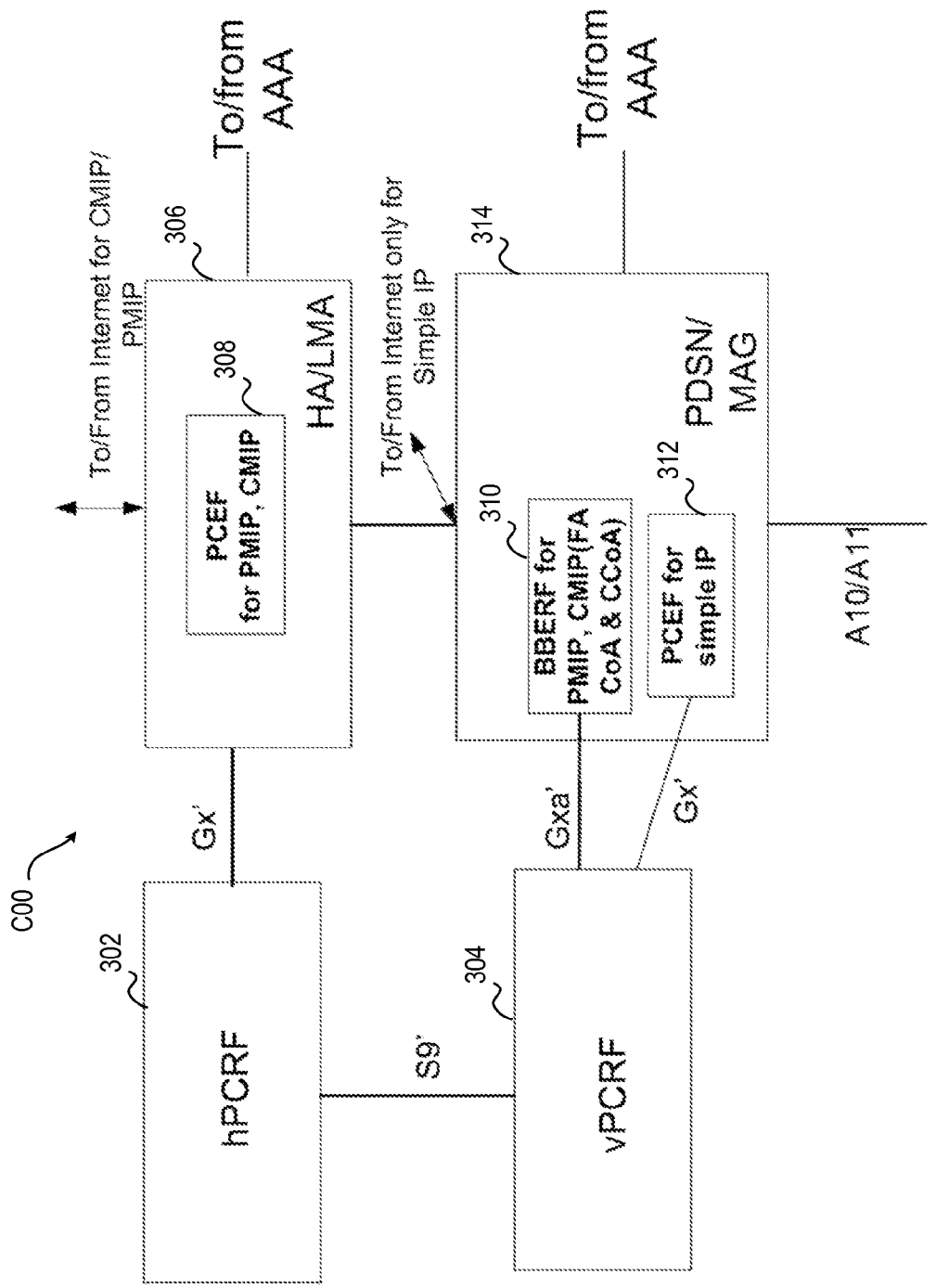
FIG. 3 illustrates a schematic block diagram of an HRPD/1x Packet Policy and Charging Control (PCC) Architecture.

In another aspect, the present innovation addresses Policy and Charging Control (PCC) call flows for cdma2000. In FIG. 3, an HRPD/1x Packet PCC Architecture 300 can include an hPCRF 302 that communicates via an S9' interface (i.e., a possibly modified current S9 interface) to a vPCRF 304. The hPCRF 302 communicates via a Gx' interface (i.e., a possibly modified current Gx interface) to a Home Agent (HA)/Local Mobility Anchor (LMA) 306 that includes a PCEF 308 for Proxy Mobile IP (PMIP) and Client Mobile IP (CMIP). The vPCRF 304 communicates via a Gxa' (i.e., a possibly modified current Gxa interface) interface to a Bearer Binding and Event Reporting Function (BBERF) 310 for PMIP, CMIP (Foreign Agent (FA) Care of Address (CoA) and Collocated Care of Address (CCoA)) and via a Gx' interface to a PCEF 312 for simple IP, both of a Packet Data Serving Node (PDSN)/Mobile Access Gateway (MAG) 314. The HA/LMA 306 and PDSN/MAG 314 are each interfaced to each other, to the Internet for CMIP, PMIP, and Simple IP, and to respective Authentication, Authorization, Accounting (AAA). The PDSN/MAG 314 also has an A10/A11 interface.

Figure 4:
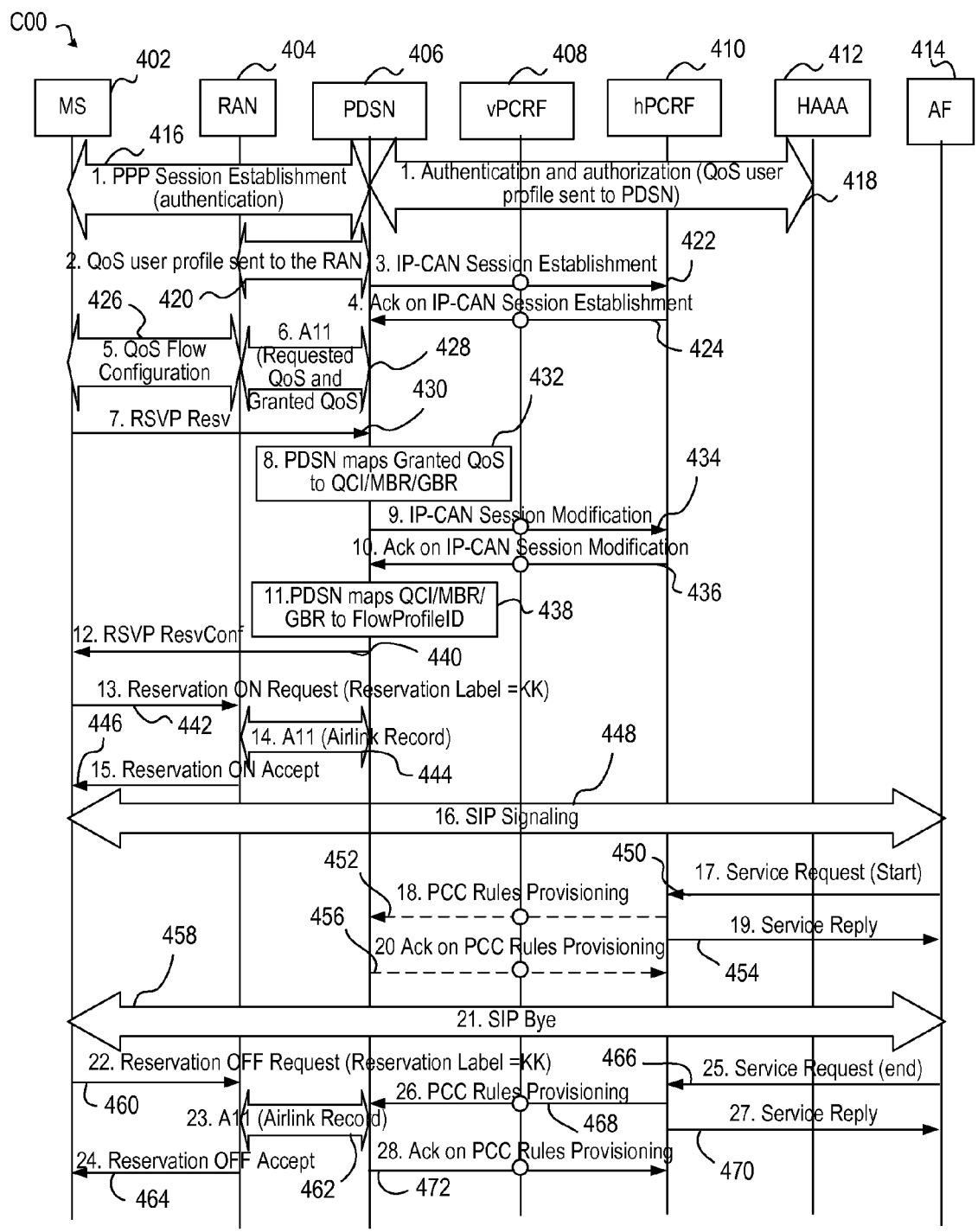
FIG. 4 illustrates a call flow for User Equipment (UE)-Initiated Quality of Service (QoS) with PCC Interaction for Simple Internet Protocol (IP).

In FIG. 4, a call flow 400 is depicted for UE-Initiated QoS with PCC Interaction (Simple IP) performed by a Mobile Station (MS) 402, Radio Access Network (RAN) 404, PDSN 406, vPCRF 408, hPCRF 410, Home Authentication, Authorization, Accounting (HAAA) 412 and AF (Application Function) 414. At step 1, MS 402 performs Point-to-Point Protocol (PPP) session establishment (authentication) with PDSN 406 (block 416). In turn, the PDSN 406 and HAAA 412 coordinate authentication and authorization wherein QoS user profile is sent to the PDSN 406 (block 418). At step 2, the PDSN 406 sends the QoS user profile to the RAN 404 (block 420). At step 3, Internet Protocol Connectivity Access Network (IP-CAN) session establishment is sent by PDSN 406 to the hPCRF 410 (block 422), which in turn in step 4 responds with an Acknowledgement (Ack) (block 424). In step 5, the MS 402 communicates QoS flow configuration with the RAN 404 (block 426). In step 6, the RAN 404 communicates with the PDSN 406 regarding the requested QoS and granted QoS (block 428). In step 7, the MS 402 sends RSVP Resv to the PDSN 406 (block 430). In step 8, the PDSN 406 maps granted QoS to QoS Class Identifier (QCI), Maximum Bit Rate (MBR), or Guaranteed Bit Rate (GBR) (block 432). In step 9, the PDSN 406 sends IP-CAN session modification to hPCRF 410 (block 434), which in step 10 is acknowledged (block 436). In step 11, the PDSN 406 maps QCI/MBR/GBR to FlowProfileID (block 438). In step 12, the PDSN 406 sends RSVP ResvConf to MS 402 (block 440). Steps 5 to 12 are QoS presetup procedures. In step 13, the MS 402 responds to the PDSN 406 with Reservation ON Request (Reservation Label=kk) (block 442). In step 14, the PDSN 406 communicates an airlink record via A11 interface with the RAN 404 (block 444). In step 15, the PDSN 406 sends Reservation ON Accept to the MS 402 (block 446). In step 16, Session Initiation Protocol (SIP) signaling is performed (block 448). In step 17, the AF 414 sends a service request (Start) to the hPCRF 410 (block 450). In step 18, PCC rules provisioning is sent from hPCRF 410 to the PDSN 406 (block 452). In step 19, the hPCRF 410 sends a service reply to AF 414 (block 454). In step 20, the PDSN 406 sends Ack on PCC Rules Provisioning to the hPCRF 410 (block 456). In step 21, SIP Bye is communicated (block 458). In step 22, the MS 402 sends Reservation OFF Request (Reservation Label=kk) is sent to RAN 404 (block 460). In step 23, the RAN 404 communicates airlink record via A11 interface with PDSN 406 (block 462). In step 24, the RAN 404 sends Reservation OFF Accept to MS 402 (block 464). In step 25, the AF 414 sends Service Request (End) to hPCRF 410 (block 466). In step 26, the hPCRF 410 sends PCC rules provisioning to PDSN 406 (block 468). In step 27, the hPCRF 410 sends Service Reply to the AF 414 (block 470). In step 28, the PDSN 406 acknowledges the PCC rules provisioning (block 472).

Figure 5:
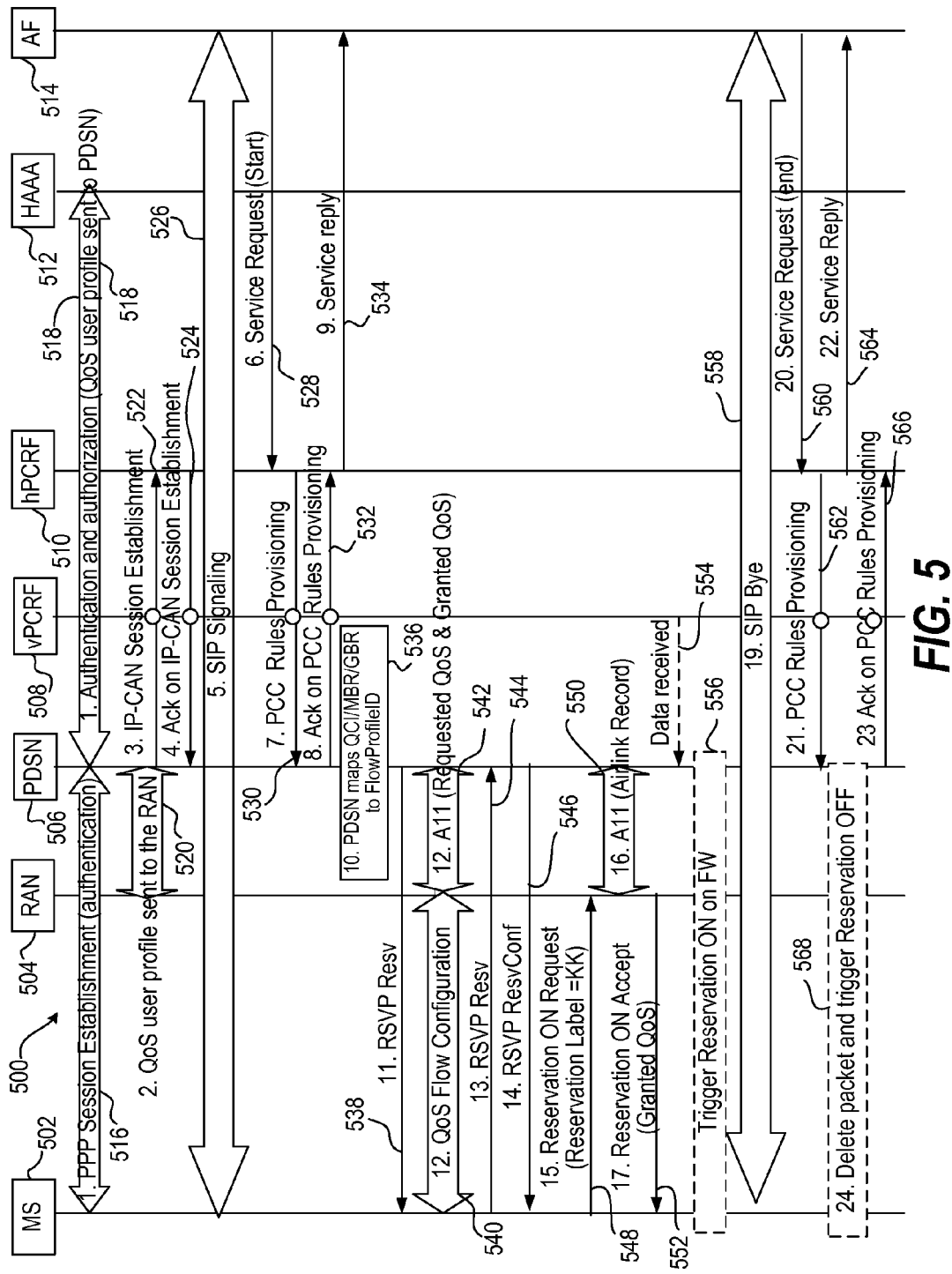
FIG. 5 illustrates a call flow for Network-Initiated QoS with PCC Interaction for Simple IP.

In FIG. 5, a call flow 500 is depicted for NW-initiated QoS with PCC Interaction (Simple IP) performed by an MS 502, RAN 504, PDSN 506, vPCRF 508, hPCRF 510, HAAA 512 and AF 514. At step 1, MS 502 performs Point-to-Point Protocol (PPP) session establishment (authentication) with PDSN 506 (block 516). In turn, the PDSN 506 and HAAA 512 coordinate authentication and authorization wherein QoS user profile is sent to the PDSN 506 (block 518). At step 2, the PDSN 506 sends the QoS user profile to the RAN 504 (block 520). At step 3, Internet Protocol Connectivity Access Network (IP-CAN) session establishment is sent by PDSN 506 to the hPCRF 510 (block 522), which in turn in step 4 responds with an Acknowledgement (Ack) (block 524). In step 5, Session Initiation Protocol (SIP) signaling is performed (block 526). In step 6, the Application Function (AF) 514 sends a service request (Start) to the hPCRF 510 (block 528). In step 7, PCC rules provisioning is sent from hPCRF 510 to the PDSN 506 (block 530). In step 8, the hPCRF 510 sends a service reply to AF 514 (block 532). In step 9, the PDSN 506 sends Ack on PCC Rules Provisioning to the hPCRF 510 (block 534). In step 10, the PDSN 506 maps granted QoS to QCI/MBR/GBR (block 532). In step 11, the PDSN 506 sends RSVP Resv to MS 502 (block 538). In step 12, the MS 502 communicates QoS flow configuration with the RAN 504 (block 540). The RAN 504 communicates with the PDSN 506 regarding the requested QoS and granted QoS (block 542). In step 13, the MS 502 sends RSVP Resv to the PDSN 506 (block 544). In step 14, the PDSN 506 sends RSVP ResvConf to MS 502 (block 546). In step 15, the MS 502 responds to the PDSN 506 with Reservation ON Request (Reservation Label=kk) (block 548). In step 16, the PDSN 506 communicates an airlink record via A11 interface with the RAN 504 (block 550). In step 17, the PDSN 506 sends Reservation ON Accept (Granted QoS) to the MS 502 (block 552). In step 18, data from the vPCRF 508 is received by the PDSN 506 (block 554) that triggers Reservation ON on Forward with MS 502 (block 556). In step 19, SIP Bye is communicated (block 558). In step 20, the AF 514 sends Service Request (End) to hPCRF 510 (block 560). In step 21, the hPCRF 510 sends PCC rules provisioning to PDSN 506 (block 562). In step 22, the hPCRF 510 sends Service Reply to the AF 514 (block 564). In step 23, the PDSN 506 acknowledges the PCC rules provisioning (block 566). In step 24, packets are deleted and Reservation OFF is triggered between MS 502 and PDSN 506 (block 568).

Figure 6:
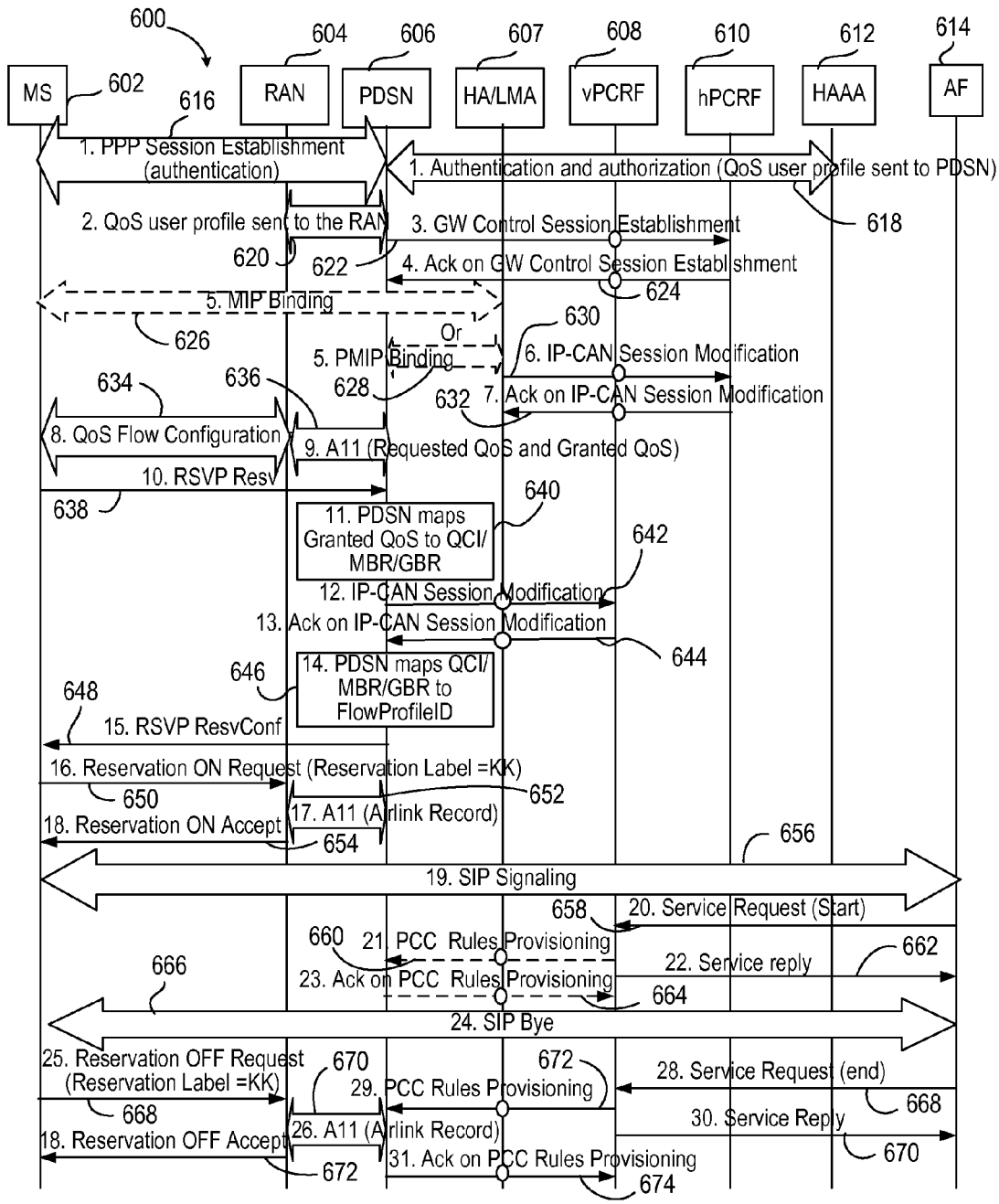
FIG. 6 illustrates a call flow for UE-Initiated QoS with PCC Interaction for Proxy Mobile IP (PMIP) or Client Mobile IP (CMIP).
Figure 7:
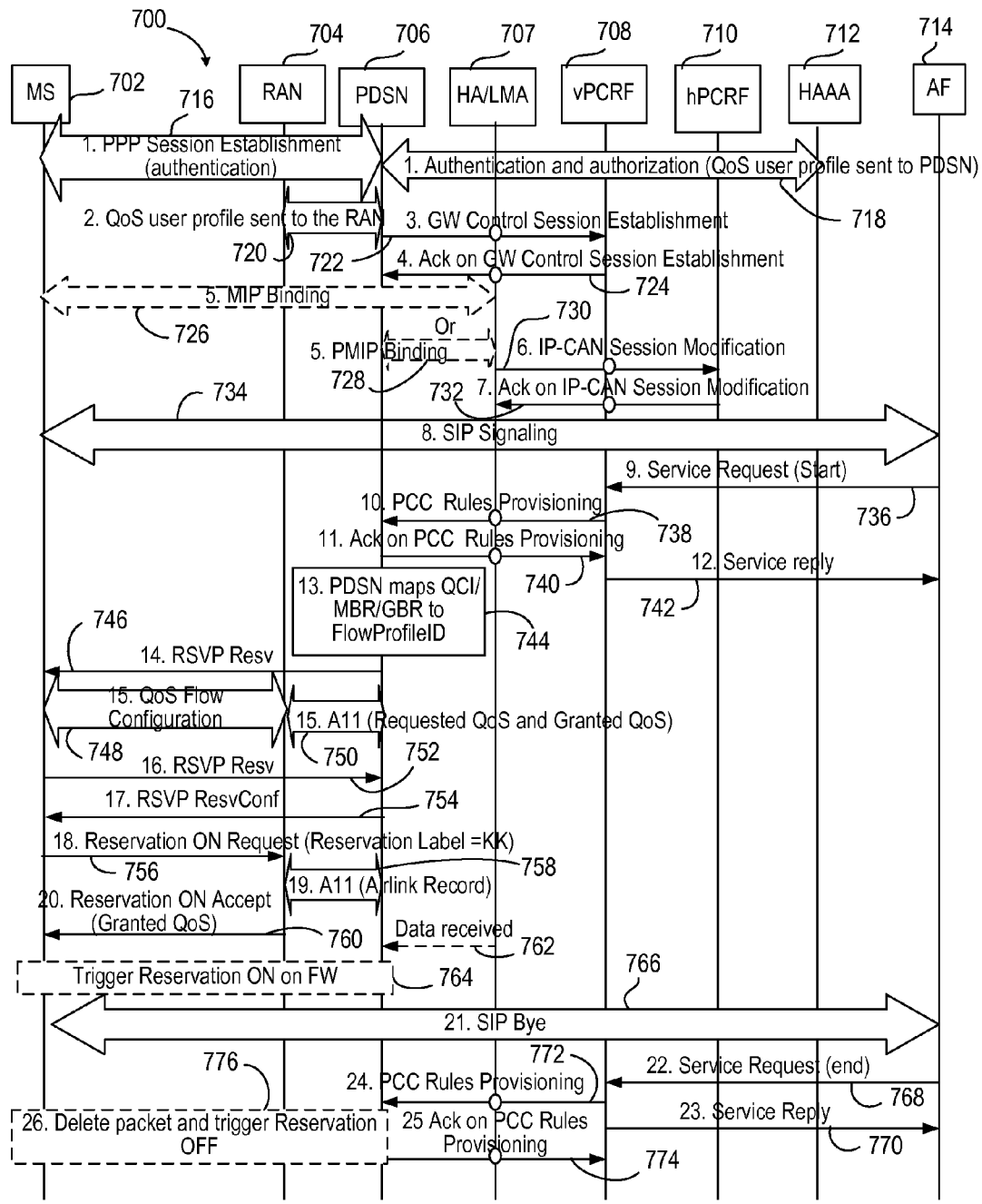
FIG. 7 illustrates a call flow for Network-Initiated QoS with PCC Interaction for Proxy Mobile IP (PMIP) or Client Mobile IP (CMIP).

In FIG. 6, a call flow 600 is depicted for UE-Initiated QoS with PCC Interaction (CMIP/PMIP) performed by an MS 602, RAN 604, PDSN 606, HA/LMA 607, vPCRF 608, hPCRF 610, HAAA 612 and AF 614. At step 1, MS 602 performs PPP session establishment (authentication) with PDSN 606 (block 616). In turn, the PDSN 606 and HAAA 612 coordinate authentication and authorization wherein QoS user profile is sent to the PDSN 606 (block 618). At step 2, the PDSN 606 sends the QoS user profile to the RAN 604 (block 620). At step 3, GW Control session establishment is sent by PDSN 606 to the hPCRF 610 (block 622), which in turn in step 4 responds with an Acknowledgement (Ack) (block 624). In step 5, Mobile Internet Protocol (MIP) binding occurs between the MS 602 and the HA/LMA 607 (block 626). Alternatively, PMIP binding occurs between the PDSN 606 and HA/LMA 607 (block 628). At step 6, IP-CAN session establishment is sent by HA/LMA 607 to the hPCRF 610 (block 630), which in turn in step 7 responds with an Acknowledgement (Ack) (block 632). In step 8, the MS 602 communicates QoS flow configuration with the RAN 604 (block 634). In step 9, the RAN 604 communicates with the PDSN 606 regarding the requested QoS and granted QoS (block 636). In step 10, the MS 602 sends RSVP Resv to the PDSN 606 (block 638). In step 11, the PDSN 606 maps granted QoS to QoS Class Identifier (QCI), Maximum Bit Rate (MBR), or Guaranteed Bit Rate (GBR) (block 640). In step 12, the PDSN 606 sends IP-CAN session modification to hPCRF 610 (block 642), which in step 13 is acknowledged (block 644). In step 14, the PDSN 606 maps QCI/MBR/GBR to FlowProfileID (block 646). In step 15, the PDSN 606 sends RSVP ResvConf to MS 602 (block 648). In step 16, the MS 602 responds to the PDSN 606 with Reservation ON Request (Reservation Label=kk) (block 650). In step 17, the PDSN 606 communicates an airlink record via A11 interface with the RAN 604 (block 652). In step 18, the PDSN 606 sends Reservation ON Accept to the MS 602 (block 654). In step 19, SIP signaling is performed (block 656). In step 20, the AF 614 sends a service request (Start) to the hPCRF 610 (block 658). In step 21, PCC rules provisioning is sent from hPCRF 610 to the PDSN 606 (block 660). In step 22, the hPCRF 610 sends a service reply to AF 614 (block 662). In step 23, the PDSN 606 sends Ack on PCC Rules Provisioning to the hPCRF 610 (block 664). In step 24, SIP Bye is communicated (block 666). In step 25, the MS 602 sends Reservation OFF Request (Reservation Label=kk) is sent to RAN 604 (block 668). In step 26, the RAN 604 communicates airlink record via A11 interface with PDSN 606 (block 670). In step 27, the RAN 604 sends Reservation OFF Accept to MS 602 (block 672). In step 28, the AF 614 sends Service Request (End) to hPCRF 610 (block 674). In step 29, the hPCRF 610 sends PCC rules provisioning to PDSN 606 (block 676). In step 30, the hPCRF 610 sends Service Reply to the AF 614 (block 678). In step 31, the PDSN 606 acknowledges the PCC rules provisioning (block 680).

In F17. 7, a call flow 700 is depicted for NW-initiated QoS with PCC Interaction (CMIP/PMIP) performed by an MS 702, RAN 704, PDSN 706, vPCRF 708, hPCRF 710, HAAA 712 and AF 714. At step 1, MS 702 performs PPP session establishment (authentication) with PDSN 706 (block 716). In turn, the PDSN 706 and HAAA 712 coordinate authentication and authorization wherein QoS user profile is sent to the PDSN 706 (block 718). At step 2, the PDSN 706 sends the QoS user profile to the RAN 704 (block 720). At step 3, GW Control session establishment is sent by PDSN 706 to the vPCRF 708 (block 722), which in turn in step 4 responds with an Acknowledgement (Ack) (block 724). In step 5, MIP binding occurs between the MS 702 and the HA/LMA 707 (block 726). Alternatively, PMIP binding occurs between the PDSN 706 and HA/LMA 707 (block 728). At step 6, IP-CAN session establishment is sent by PDSN 706 to the hPCRF 710 (block 730), which in turn in step 7 responds with an Acknowledgement (Ack) (block 732). In step 8, SIP signaling is performed (block 734). In step 9, the AF 714 sends a service request (Start) to the hPCRF 710 (block 736). In step 10, PCC rules provisioning is sent from hPCRF 710 to the PDSN 706 (block 738). In step 11, the PDSN 706 sends Ack on PCC Rules Provisioning to the hPCRF 710 (block 740). In step 12, the hPCRF 710 sends a service reply to AF 714 (block 742). In step 13, the PDSN 706 maps QCI/MBR/GBR to FlowProfileID (block 744). In step 14, the PDSN 706 sends RSVP Resv to MS 702 (block 746). In step 15, the MS 702 communicates QoS flow configuration with the RAN 704 (block 748). The RAN 704 communicates with the PDSN 706 regarding the requested QoS and granted QoS (block 750). In step 16, the MS 702 sends RSVP Resv to the PDSN 706 (block 752). In step 17, the PDSN 706 sends RSVP ResvConf to MS 702 (block 754). In step 18, the MS 702 responds to the PDSN 706 with Reservation ON Request (Reservation Label=kk) (block 756). In step 19, the PDSN 706 communicates an airlink record via A11 interface with the RAN 704 (block 758). In step 20, the PDSN 706 sends Reservation ON Accept (Granted QoS) to the MS 702 (block 760). In step 21, data from the vPCRF 708 is received by the PDSN 706 (block 762) that triggers Reservation ON on Forward with MS 702 (block 764). In step 21, SIP Bye is communicated (block 766). In step 22, the AF 714 sends Service Request (End) to hPCRF 710 (block 760). In step 23, the hPCRF 710 sends PCC rules provisioning to PDSN 706 (block 768). In step 23, the PDSN 706 acknowledges the PCC rules provisioning (block 770). In step 24, the vPCRF 708 sends Service Reply to the AF 714 (block 772). In step 25, the PDSN 706 sends Ack on PCC rules provisioning to vPCRF 708 (block 774). In step 26, packets are deleted and Reservation OFF is triggered between MS 702 and PDSN 706 (block 776).

Recognizing that the current 3GPP PCC has not considered separating QoS configuration with the reservation, the present innovation in one aspect is only used for (e)HRPD to speed up the QoS call setup. To that end, a first option provides that the PDSN/HSGW can continue to cache the PF and QoS upon receiving the PCC Rules deletion from the PCRF for UE initiated QoS. Further recognizing that the current QoS design assumes that the QoS configuration and Policy Filter (PF) is stored in the network, for UE-Initiated QoS, the PDSN must cache it until the UE requests to delete it. In a second option, the PCRF behavior is changed to not delete the PF and QoS if the RAT-Type is HRPD even if the application function indicates that the application no longer needs the QoS.

The present innovation in another aspect provides for NW-initiated QoS Reservation ON/OFF. In a first option, successful RSVP flow setup initiated by the NW will trigger the UE to send Reservation ON. Successful RSVP flow delete initiated by the NW will trigger the UE to send Reservation OFF.

In a second option, when the data arrives at the HSGW, the HSGW sends A11 signaling to the AN to turn on Reservation for both forward and reverse link. Reservation OFF relies on the detection of no data received for a configured period of time.

In a third option, if application signaling such as SIP is used, for voice traffic, the PCRF can send a request (for example, Gate ON/OFF) to the HSGW for Reservation ON and OFF. Then the HSGW sends A11 signaling to the AN.

Ms-Initiated QoS in HRPD with PCC Architecture:

Operators may use the same QoS (QoS FlowProfileID) for different services that have different charging mechanisms. For example, video teleconference (VT) (include both audio and video) is volume based accounting and Voice over Internet Protocol (VoIP) is duration based accounting. Both MS-initiated QoS and Network-Initiated QoS can support the above requirements with the following limitation: No pre-QoS setup. Thus, the call setup time is longer. The present innovation provides for MS initiated QoS with pre-QoS setup by addressing accounting triggering. PCRF policy control is based on HRPD Reservation On/OFF. Policy Enforcement in the PDSN uses 5-tuples so that the MS cannot use the granted QoS for other usages.

Five (5) different options are disclosed that provide improved performance compared to the current situation. In an exemplary aspect, these innovations would not require MS/Network to setup and tear down the QoS every time the call is setup.

First, an option 1 uses MS pre-setup QoS using a wildcard with MS, PDSN, and PCRF caching the QoS. For example, a wild card uses 3-tuples (MS's IP address, port, and transport protocol) as the source IP address/port. During the pre-QoS setup, the PCRF may turn off the gate so that the MS cannot use PF and QoS for other traffic based on policy. For example, based on QoS and Packet Filter or the usage of the interface between an Application server and the PCRF, the PCRF can turn off the gate. The PCRF will send Gate ON to the PDSN when the call is established and is triggered by application signaling exchange such as SIP INVITE. The PCRF will send Gate OFF to the PDSN when the call is released and is triggered by application signaling such as SIP BYE. The MS, PDSN and PCRF will retain the pre-established QoS and wild card PF after each call is released. This will be new behavior for PCRF. Reservation On/Off can still be used for QoS based accounting in the PDSN as specified in X.S0011-D. In addition 3GPP PCC charging can be used to correlate with accounting based on service information (e.g. duration based on SIP INVITE and BYE).

Figure 8:
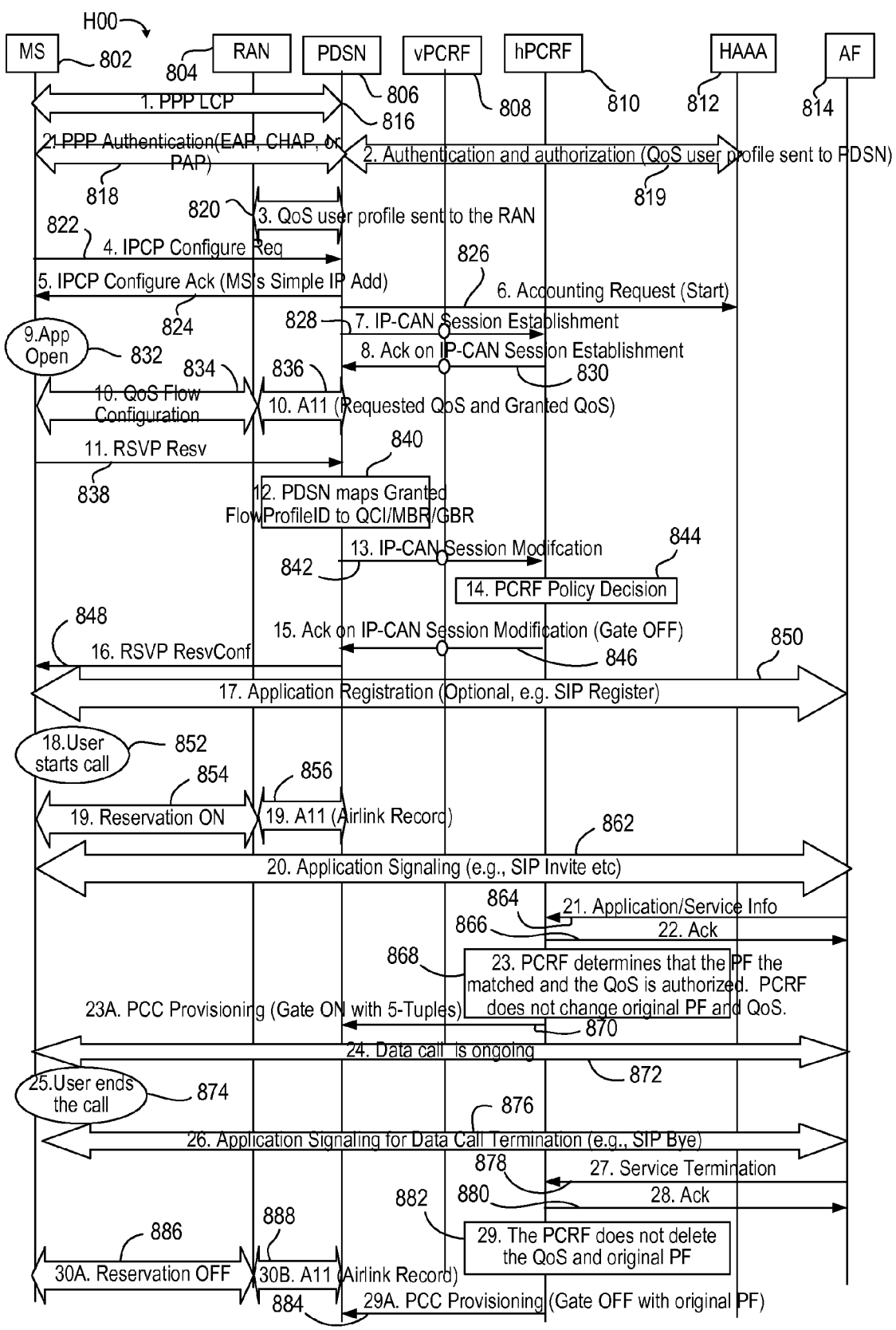
FIG. 8 illustrates a call flow for mobile station (MS)-initiated QoS in High Rate Packet Data (HRPD) with PCC architecture as a first option.

In FIG. 8, an exemplary call flow 800 is depicted for option 1 for MS-initiated QoS in HRPD with PCC architecture performed by an MS 802, RAN 804, PDSN 806, vPCRF 808, hPCRF 810, HAAA 812 and AF 814. At step 1, MS 802 performs PPP Link Control Protocol (LCP) with PDSN 806 (block 816). In step 2, the MS 802 and PDSN 806 communicate PPP authentication, which can be for instance Extensible Authentication Protocol (EAP), Challenge-Handshake Authentication Protocol (CHAP), and Password Authentication Protocol (PAP) (block 818). Authentication and authorization (QoS user profile) is sent from HAAA 812 to PDSN 806 (block 819). In step 3, the PDSN 806 sends the QoS user profile to RAN 804 (block 820). In step 4, the MS 802 sends an Internet Protocol Control Protocol (IPCP) Configuration Request to the PDSN 806 (block 822). In step 5, the PDSN 806 sends an IPCP Configure Ack (MS's Simple IP Add) to the MS 802 (block 824). In step 6, the PDSN 806 sends an Accounting Request (Start) to the HAAA 812 (block 826). In step 7, the PDSN 806 sends IP-CAN Session Establishment to hPCRF 810 (block 828). In step 8, the hPCRF 810 sends Ack on IP-CAN Establishment to the PDSN 806 (block 830). In step 9, the MS 802 opens an application (block 832). In step 10, the MS 802 and RAN 804 communicate QoS Flow Configuration (block 834). The RAN 804 and PDSN 806 communicate via A11 interface (Requested QoS and Granted QoS) (block 836). In step 11, MS 802 sends RSVP Resv to PDSN 806 (block 838). In step 12, PDSN 806 maps Granted FlowProfileID to QCI/MBR/GBR (block 840). In step 13, the PDSN 806 sends IP-CAN Session Modification to hPCRF 810 (block 842). In step 14, hPCRF 810 performs PCRF Policy Decision (block 8440. In step 15, hPCRF 810 sends Ack on IP-CAN Session Modification (Gate OFF) to PDSN 806 (block 846). In step 16, PDSN 806 sends RSVP Resv-Conf to MS 802 (block 848). In step 17, Application Registration (Optional, e.g., SIP Register) is performed between MS 802 and AF 814 (block 850). In step 18, a user uses MS 802 to start a call (block 852). In step 19, MS 802 sends Reservation ON to RAN 804 (block 854). The RAN 804 and PDSN 806 communicate via A11 interface (Airlink Record) (block 856). In step 20, Application Signaling (e.g., SIP invite, etc.) occurs between MS 802 and AF 814 (block 862). In step 21, AF sends Application/Service Information to hPCRF 810 (block 864). In step 22, hPCRF 810 sends Ack to AF 814 (block 866). In step 23, hPCRF 810 determines that the PF matched and the QoS is authorized and thus neither is changed (block 868). In step 23A, hPCRF 810 sends PCC Provisioning (Gate ON with 5-tuples) to PDSN 806 (block 870). In step 24, a data call is ongoing between MS 802 and AF 814 (block 872). In step 25, the user of MS 802 ends the call (block 874). In step 26, Application Signaling for Data Call Termination (e.g., SIP Bye) occurs between MS 802 and AF 814 (block 876). In step 27, AF 814 sends Service Termination to hPCRF 810 (block 878). In step 28, hPCRF 880 sends Ack to AF 814 (block 880). In step 29, hPCRF 810 does not delete the QoS and original PF (block 882). In step 29A, hPCRF 810 sends PCC Provisioning (Gate OFF with original PF) is sent to PDSN 806 (block 884). In step 30A, MS 802 communicates Reservation OFF with RAN 804 (block 886). In step 30B, RAN 804 communicates via A11 interface (Airlink Record) with PDSN 806 (block 888).

Second, an Option 1.1 is generally the same as Option 1 except for the followings: The PDSN will request for Gate ON/OFF to the PCRF based on Reservation ON/OFF. PCC protocol changes are made so that Gate On/Off requests can be made from PDSN to the PCRF. The PCRF authorizes Gate ON request only when it receives the indication from the application server. An optimization can be used to allow the PCRF to allow the Gate On request before receiving indication from the application server. This can be a benefit in the case where application signaling is absent. The authorization can be revoked if no indication is received from the application server within a certain duration after authorizing the QoS.

It should be noted that the MS may use the reservation for a short period for other traffic. This option may be needed as contrasted with Option 1 if the PCRF wants to control the policy with the user traffic that is not allowed to be used simultaneously. For example, when the user traffic is sent between the MS and Server 1 and the traffic is not allowed to be sent between MS and Server 2.

Figure 9:
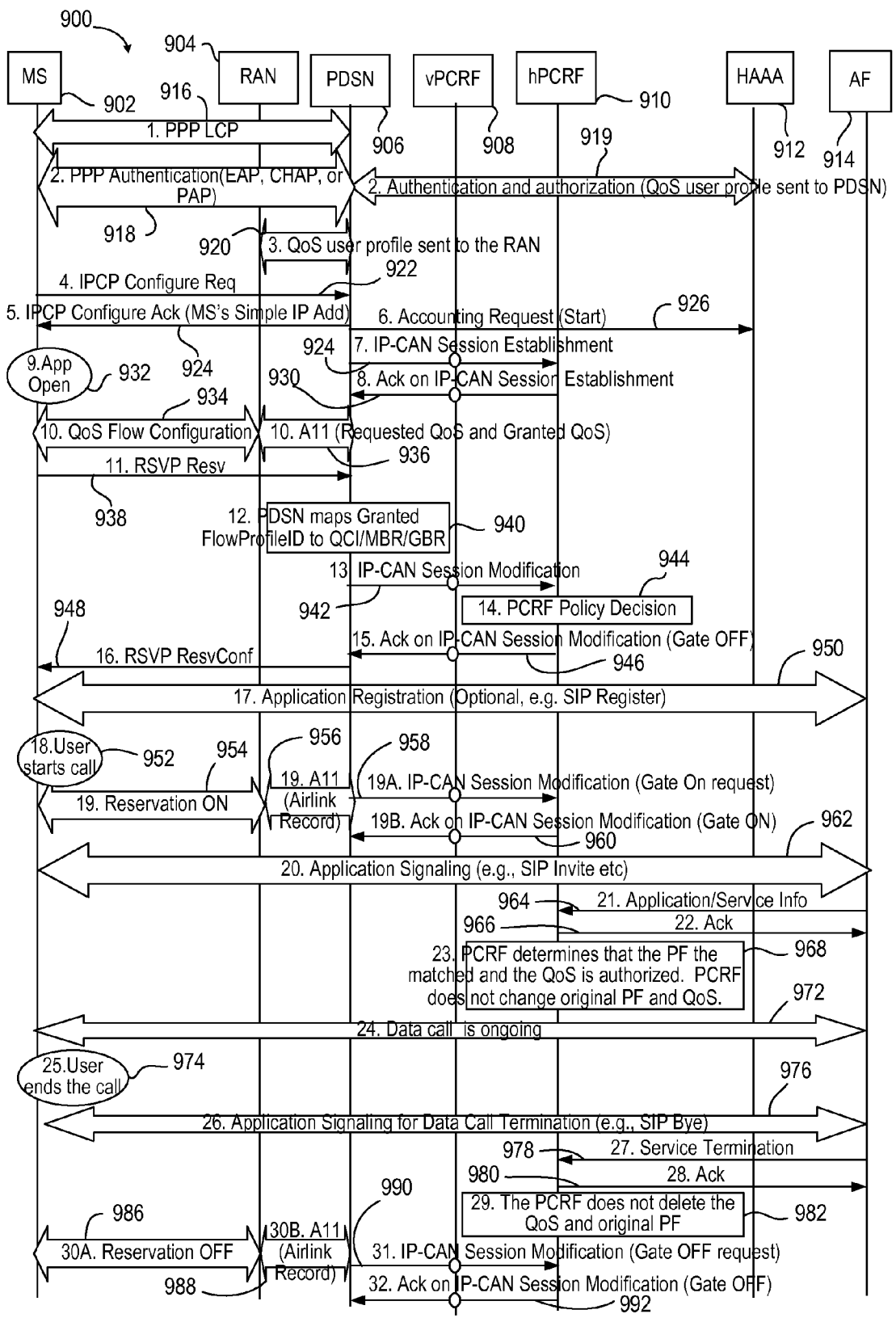
FIG. 9 illustrates a call flow for MS-initiated QoS in HRPD with PCC architecture as a variation of the first option.

In FIG. 9, an exemplary call flow 900 is depicted for option 1.1 for MS-initiated QoS in HRPD with PCC architecture performed by an MS 902, RAN 904, PDSN 906, vPCRF 908, hPCRF 910, HAAA 912 and AF 914. At step 1, MS 902 performs PPP LCP with PDSN 906 (block 916). In step 2, the MS 902 and PDSN 906 communicate PPP authentication, which can be for instance Extensible Authentication Protocol (EAP), Challenge-Handshake Authentication Protocol (CHAP), and Password Authentication Protocol (PAP) (block 918). Authentication and authorization (QoS user profile) is sent from HAAA 912 to PDSN 906 (block 919). In step 3, the PDSN 906 sends the QoS user profile to RAN 904 (block 920). In step 4, the MS 902 sends an Internet Protocol Control Protocol (IPCP) Configuration Request to the PDSN 906 (block 922). In step 5, the PDSN 906 sends an IPCP Configure Ack (MS's Simple IP Add) to the MS 902 (block 924). In step 6, the PDSN 906 sends an Accounting Request (Start) to the HAAA 912 (block 926). In step 7, the PDSN 906 sends IP-CAN Session Establishment to hPCRF 910 (block 928). In step 8, the hPCRF 910 sends Ack on IP-CAN Establishment to the PDSN 906 (block 930). In step 9, the MS 902 opens an application (block 932). In step 10, the MS 902 and RAN 904 communicate QoS Flow Configuration (block 934). The RAN 904 and PDSN 906 communicate via A11 interface (Requested QoS and Granted QoS) (block 936). In step 11, MS 902 sends RSVP Resv to PDSN 906 (block 938). In step 12, PDSN 906 maps Granted FlowProfileID to QCI/MBR/GBR (block 940). In step 13, the PDSN 906 sends IP-CAN Session Modification to hPCRF 910 (block 942). In step 14, hPCRF 910 performs PCRF Policy Decision (block 944). In step 15, hPCRF 910 sends Ack on IP-CAN Session Modification (Gate OFF) to PDSN 906 (block 946). In step 16, PDSN 906 sends RSVP ResvConf to MS 902 (block 948). In step 17, Application Registration (Optional, e.g., SIP Register) is performed between MS 902 and AF 914 (block 950). In step 18, a user uses MS 902 to start a call (block 952). In step 19, MS 902 sends Reservation ON to RAN 904 (block 954). The RAN 904 and PDSN 906 communicate via A11 interface (Airlink Record) (block 956). In step 19A, PDSN 906 sends IP-CAN Session Modification (Gate ON request) to hPCRF 910 (block 958). In step 19B, the hPCRF 910 sends Ack on IP-CAN Session Modification (Gate OFF) to PDSN 906 (block 960). In step 20, Application Signaling (e.g., SIP invite, etc.) occurs between MS 902 and AF 914 (block 962). In step 21, AF sends Application/Service Information to hPCRF 910 (block 964). In step 22, hPCRF 910 sends Ack to AF 914 (block 966). In step 23, hPCRF 910 determines that the PF matched and the QoS is authorized and thus neither is changed (block 968). In step 24, a data call is ongoing between MS 902 and AF 914 (block 972). In step 25, the user of MS 902 ends the call (block 974). In step 26, Application Signaling for Data Call Termination (e.g., SIP Bye) occurs between MS 902 and AF 914 (block 976). In step 27, AF 914 sends Service Termination to hPCRF 910 (block 978). In step 28, hPCRF 980 sends Ack to AF 914 (block 980). In step 29, hPCRF 910 does not delete the QoS and original PF (block 982). In step 30A, MS 902 communicates Reservation OFF with RAN 904 (block 986). In step 30B, RAN 904 communicates via A11 interface (Airlink Record) with PDSN 906 (block 988). In step 31, the PDSN 906 sends IP-CAN Session Modification (Gate OFF request) to hPCRF 910 (block 990). In step 32, the hPCRF 910 sends Ack on IP-CAN session Modification (Gate OFF) to PDSN 906 (block 992).

Third, an Option 2 provides performs MS pre-setup of QoS using wild card that is the same as Option 1 with MS and PDSN retaining the pre-configured QoS; however, the PCRF is not aware of the pre-configured QoS. The MS waits for the first data call start to setup an initial PF and QoS. If the PDSN does not have the PCC rule established for the flow, then the PDSN sends an authorization request to the PCRF based on ReservationOn from the MS. The PCRF authorizes QoS request only when it receives the indication from the application server.

Similar to Option 1.1, it should be noted that the MS may use the reservation for a short period for other traffic. This option may be needed as contrasted with Option 1 if the PCRF wants to control the policy with the user traffic that is not allowed to be used simultaneously. For example, when the user traffic is sent between the MS and Server 1 and the traffic is not allowed to be sent between MS and Server 2.

The PDSN sends QoS resource release request to the PCRF based on ReservationOff from the MS. ReservationOn/Off from the MS is used for QoS based accounting as specified in X.P0011-D. In addition 3GPP PCC charging can be used to correlate with accounting based on service information (e.g., duration based on SIP INVITE and BYE).

Figure 10:
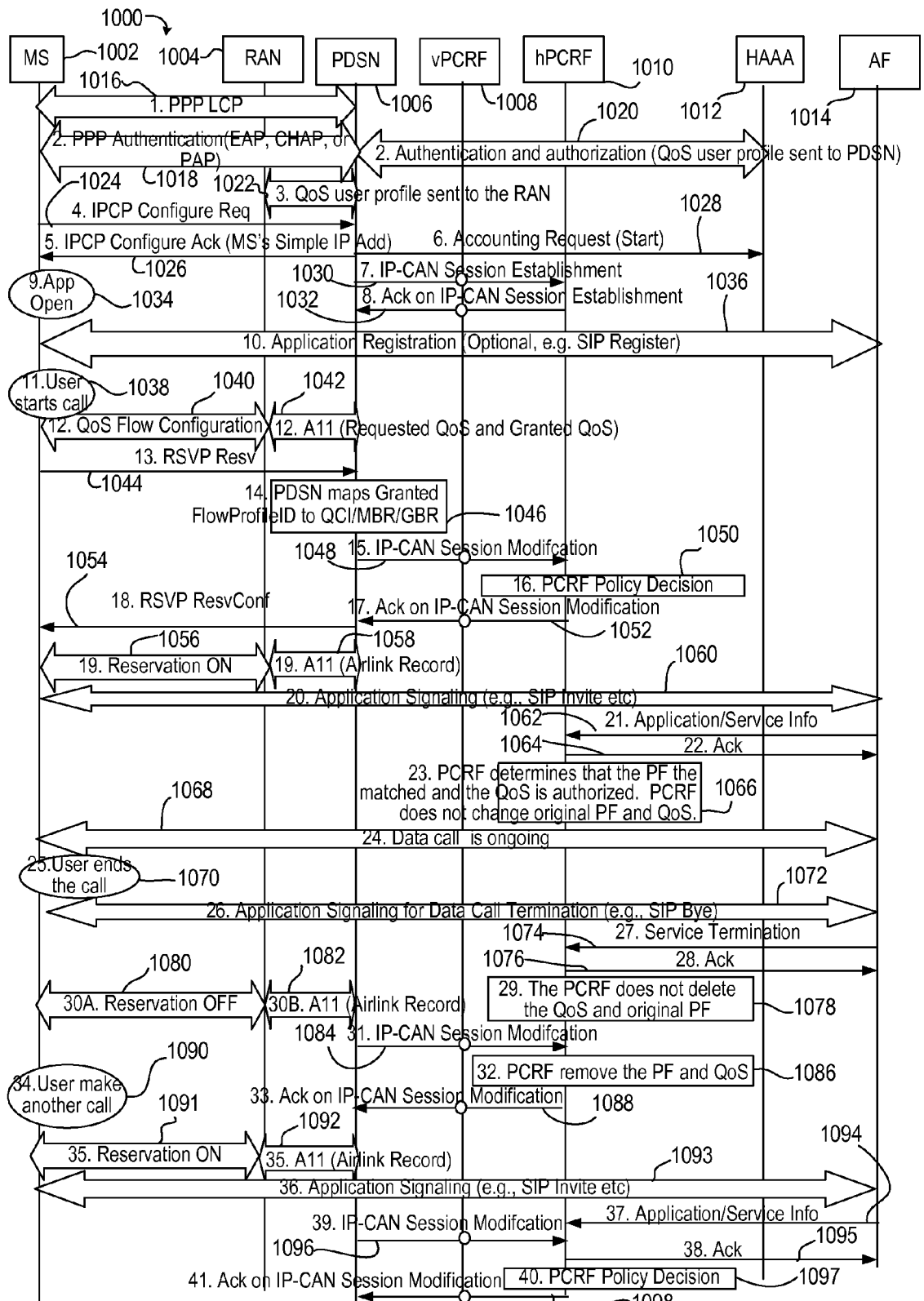
FIG. 10 illustrates a call flow for MS pre-setup of QoS using a wild card with MS and Packet Data Serving Node (PDSN) retaining the pre-configured QoS as a second option.

Thus, in FIG. 10, an exemplary call flow 1000 is depicted for option 2 for MS-initiated QoS in HRPD with PCC architecture performed by an MS 1002, RAN 1004, PDSN 1006, vPCRF 1008, hPCRF 1010, HAAA 1012 and AF 1014. At step 1, MS 1002 performs PPP LCP with PDSN 1006 (block 1016). In step 2, the MS 1002 and PDSN 1006 communicate PPP authentication, which can be for instance EAP, CHAP, and PAP (block 1018). Authentication and authorization (QoS user profile) is sent from HAAA 1012 to PDSN 1006 (block 1020). In step 3, the PDSN 1006 sends the QoS user profile to RAN 1004 (block 1022). In step 4, the MS 1002 sends an IPCP Configuration Request to the PDSN 1006 (block 1024). In step 5, the PDSN 1006 sends an IPCP Configure Ack (MS's Simple IP Add) to the MS 1002 (block 1026). In step 6, the PDSN 1006 sends an Accounting Request (Start) to the HAAA 1012 (block 1028). In step 7, the PDSN 1006 sends IP-CAN Session Establishment to hPCRF 1010 (block 1030). In step 8, the hPCRF 1010 sends Ack on IP-CAN Establishment to the PDSN 1006 (block 1032). In step 9, the MS 1002 opens an application (block 1034). In step 10, Application Registration (Optional, e.g., SIP Register) is performed between MS 1002 and AF 1014 (block 1036). In step 11, a user uses MS 1002 to start a call (block 1038). In step 12, the MS 1002 and RAN 1004 communicate QoS Flow Configuration (block 1040). The RAN 1004 and PDSN 1006 communicate via A11 interface (Requested QoS and Granted QoS) (block 1042). In step 13, MS 1002 sends RSVP Resv to PDSN 1006 (block 1044). In step 14, PDSN 1006 maps Granted FlowProfileID to QCI/MBR/GBR (block 1046). In step 15, the PDSN 1006 sends IP-CAN Session Modification to hPCRF 1010 (block 1048). In step 16, hPCRF 1010 performs PCRF Policy Decision (block 10450). In step 17, hPCRF 1010 sends Ack on IP-CAN Session Modification (Gate OFF) to PDSN 1006 (block 1052). In step 18, PDSN 1006 sends RSVP ResvConf to MS 1002 (block 1054). In step 19, MS 1002 sends Reservation ON to RAN 1004 (block 1056). The RAN 1004 and PDSN 1006 communicate via A11 interface (Airlink Record) (block 1058). In step 20, Application Signaling (e.g., SIP invite, etc.) occurs between MS 1002 and AF 1014 (block 1060). In step 21, AF sends Application/ Service Information to hPCRF 1010 (block 1062). In step 22, hPCRF 1010 sends Ack to AF 1014 (block 1064). In step 23, hPCRF 1010 determines that the PF matched and the QoS is authorized and thus neither is changed (block 1066). In step 24, a data call is ongoing between MS 1002 and AF 1014 (block 1068). In step 25, the user of MS 1002 ends the call (block 1070). In step 26, Application Signaling for Data Call Termination (e.g., SIP Bye) occurs between MS 1002 and AF 1014 (block 1072). In step 27, AF 1014 sends Service Termination to hPCRF 1010 (block 1074). In step 28, hPCRF 1080 sends Ack to AF 1014 (block 1076). In step 29, hPCRF 1010 does not delete the QoS and original PF (block 1078). In step 30A, MS 1002 communicates Reservation OFF with RAN 1004 (block 1080). In step 30B, RAN 1004 communicates via A11 interface (Airlink Record) with PDSN 1006 (block 1082). In step 31, the PDSN 1006 sends IP-CAN Session Modification to hPCRF 1010 (block 1084). In step 32, the hPCRF 1010 removes the PF and QoS (block 1086). In step 33, hPCRF 1010 sends Ack on IP-CAN session Modification (Gate OFF) to PDSN 1006 (block 1088). In step 34, the user via MS 1002 makes another call (block 1090). In step 35, MS 1002 sends Reservation ON to RAN 1004 (block 1091). The RAN 1004 and PDSN 1006 communicate via A11 interface (Airlink Record) (block 1092). In step 36, Application Signaling for Data Call Termination (e.g., SIP Bye) occurs between MS 1002 and AF 1014 (block 1093). In step 37, AF 1014 sends application/service information to hPCRF 1010 (block 1094). In step 38, hPCRF 1010 sends Ack to AF 1014 (block 1095). In step 39, PDSN 1006 sends IP-CAN Session Modification to hPCRF 1010 (block 1096). In step 40, hPCRF 1010 performs policy decision (block 1097). In step 41, hPCRF 1010 sends Ack on IP-CAN Session Modification to PDSN 1006 (block 1098).

Fourth, an Option 2.1 that uses MS & PDSN caching the QoS provides for MS pre-setup QoS using a wild card when Application is on, which is the same as Option 2. MS and PDSN retain the pre-configured QoS and the PCRF is not aware of the pre-configured QoS.

The PDSN performs the following procedures: If the PDSN does not have the PCC rule established for the flow, the PDSN sends authorization request to the PCRF based on RSVP request (for initial QoS setup) or ReservationOn (for subsequent data calls) from the MS. For MS initiated QoS, the PDSN will keep PFs when it receives the QoS deletion from the PCRF. The PDSN sends QoS resource release request to the PCRF based on ReservationOff from the MS.

The PCRF performs the following procedures: The PCRF can authorize QoS request before receiving indication from the application server. The authorization can be revoked if no indication from the application server within a certain duration after authorizing the QoS based on operator's policy. The PCRF deletes the QoS when it receives QoS resource release request from the PDSN.

ReservationOn/Off from the MS is used for QoS based accounting as specified in X.P0011-D. In addition, 3GPP PCC charging can be used to correlate with accounting based on service information (e.g., duration based on SIP INVITE and BYE). It should be noted that the MS may use the reservation for a short period for other traffic.

Figure 11:
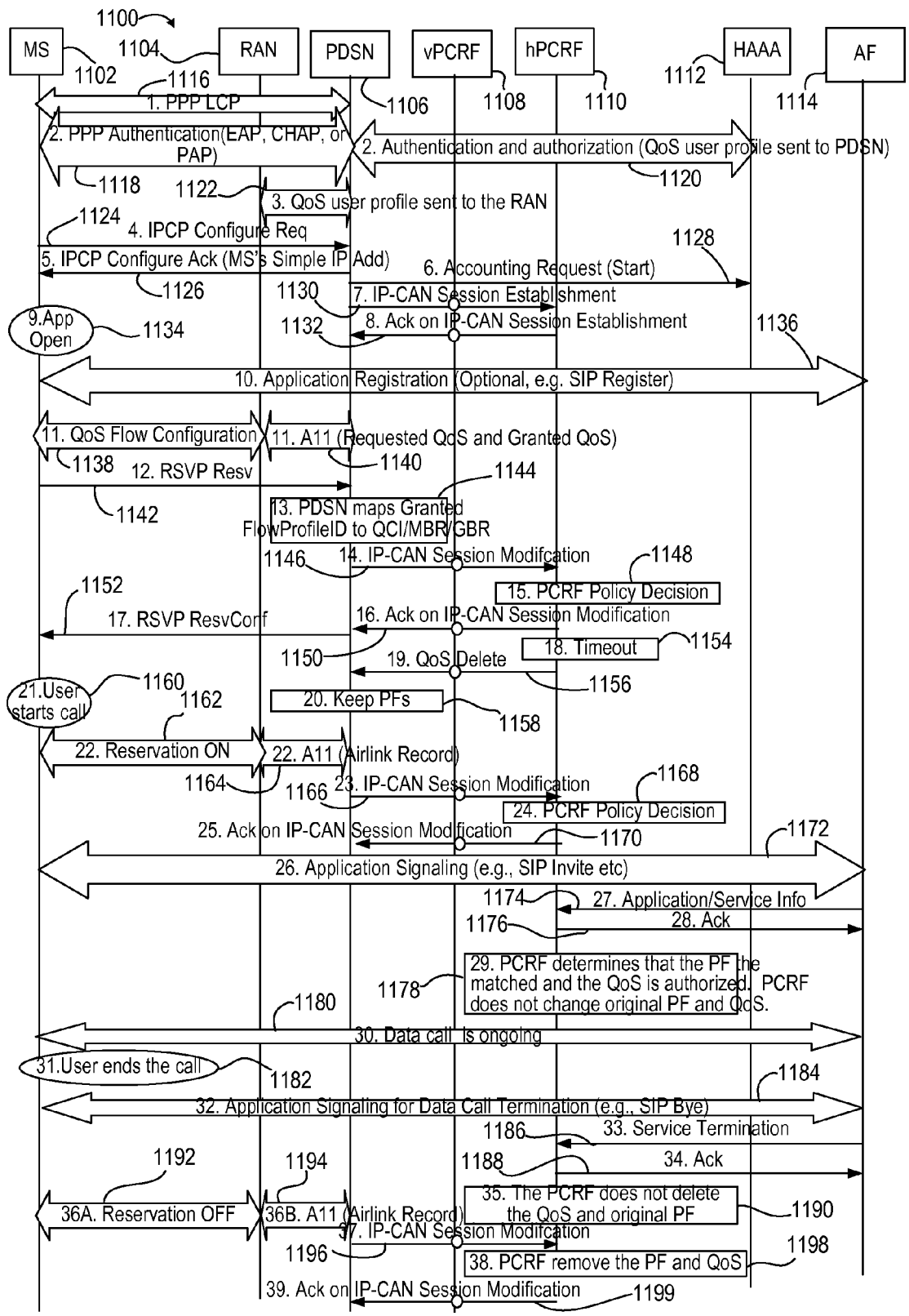
FIG. 11 illustrates a call flow for MS pre-setup of QoS using a wild card with MS and Packet Data Serving Node (PDSN) retaining the pre-configured QoS as a variation of the second option.

Thus, in FIG. 11, an exemplary call flow 1100 is depicted for option 2.1 for MS-initiated QoS in HRPD with PCC architecture performed by an MS 1102, RAN 1104, PDSN 1106, vPCRF 1108, hPCRF 1110, HAAA 1112 and AF 1114. At step 1, MS 1102 performs PPP LCP with PDSN 1106 (block 1116). In step 2, the MS 1102 and PDSN 1106 communicate PPP authentication, which can be for instance EAP, CHAP, and PAP (block 1118). Authentication and authorization (QoS user profile) is sent from HAAA 1112 to PDSN 1106 (block 1120). In step 3, the PDSN 1106 sends the QoS user profile to RAN 1104 (block 1122). In step 4, the MS 1102 sends an IPCP Configuration Request to the PDSN 1106 (block 1124). In step 5, the PDSN 1106 sends an IPCP Configure Ack (MS's Simple IP Add) to the MS 1102 (block 1126). In step 6, the PDSN 1106 sends an Accounting Request (Start) to the HAAA 1112 (block 1128). In step 7, the PDSN 1106 sends IP-CAN Session Establishment to hPCRF 1110 (block 1130). In step 8, the hPCRF 1110 sends Ack on IP-CAN Establishment to the PDSN 1106 (block 1132). In step 9, the MS 1102 opens an application (block 1134). In step 10, Application Registration (Optional, e.g., SIP Register) is performed between MS 1102 and AF 1114 (block 1136). In step 11, the MS 1102 and RAN 1104 communicate QoS Flow Configuration (block 1138). The RAN 1104 and PDSN 1106 communicate via A11 interface (Requested QoS and Granted QoS) (block 1140). In step 12, MS 1102 sends RSVP Resv to PDSN 1106 (block 1142). In step 13, PDSN 1106 maps Granted FlowProfileID to QCI/MBR/GBR (block 1144). In step 14, the PDSN 1106 sends IP-CAN Session Modification to hPCRF 1110 (block 1146). In step 15, hPCRF 1110 performs PCRF Policy Decision (block 1148). In step 16, hPCRF 1110 sends Ack on IP-CAN Session Modification (Gate OFF) to PDSN 1106 (block 1150). In step 17, PDSN 1106 sends RSVP ResvConf to MS 1102 (block 1152). In step 18, timeout occurs at hPCRF 1110 (block 1154). In step 19, hPCRF 1110 sends QoS Delete to PDSN 1106 (block 1156). In step 20, PDSN 1106 keeps PFs (block 1158). In step 21, a user uses MS 1102 to start a call (block 1160). In step 22, MS 1102 sends Reservation ON to RAN 1104 (block 1162). The RAN 1104 and PDSN 1106 communicate via A11 interface (Airlink Record) (block 1164). In step 23, the PDSN 1106 sends IP-CAN Session Modification to hPCRF 1110 (block 1166). In step 24, hPCRF 1110 performs PCRF Policy Decision (block 1168). In step 25, hPCRF 1110 sends Ack on IP-CAN Session Modification (Gate OFF) to PDSN 1106 (block 1170). In step 26, Application Signaling (e.g., SIP invite, etc.) occurs between MS 1102 and AF 1114 (block 1172). In step 27, AF sends Application/Service Information to hPCRF 1110 (block 1174). In step 28, hPCRF 1110 sends Ack to AF 1114 (block 1176). In step 29, hPCRF 1110 determines that the PF matched and the QoS is authorized and thus neither is changed (block 1178). In step 30, a data call is ongoing between MS 1102 and AF 1114 (block 1180). In step 31, the user of MS 1102 ends the call (block 1182). In step 32, Application Signaling for Data Call Termination (e.g., SIP Bye) occurs between MS 1102 and AF 1114 (block 1184). In step 33, AF 1114 sends Service Termination to hPCRF 1110 (block 1186). In step 34, hPCRF 1180 sends Ack to AF 1114 (block 1188). In step 35, hPCRF 1110 does not delete the QoS and original PF (block 1190). In step 36A, MS 1102 communicates Reservation OFF with RAN 1104 (block 1192). In step 36B, RAN 1104 communicates via A11 interface (Airlink Record) with PDSN 1106 (block 1194). In step 37, the PDSN 1106 sends IP-CAN Session Modification to hPCRF 1110 (block 1196). In step 38, the hPCRF 1110 removes the PF and QoS (block 1198). In step 39, hPCRF 1110 sends Ack on IP-CAN session Modification (Gate OFF) to PDSN 1106 (block 1199).

Fifth, an Option 3 does not use QoS pre-setup for MS-initiated QoS. MS sets up and tears down the QoS for each packet data call. The PCRF performs policy decision for each call based on 5-tupuls received from SIP signaling. The PDSN performs traffic policing based on detailed packet filters. Reservation On/Off from the MS is used for QoS based accounting in the PDSN as specified in X.S0011-D. In addition 3GPP PCC charging can be used to correlate with accounting based on service information (e.g., duration based on SIP INVITE and BYE).

Figure 12:
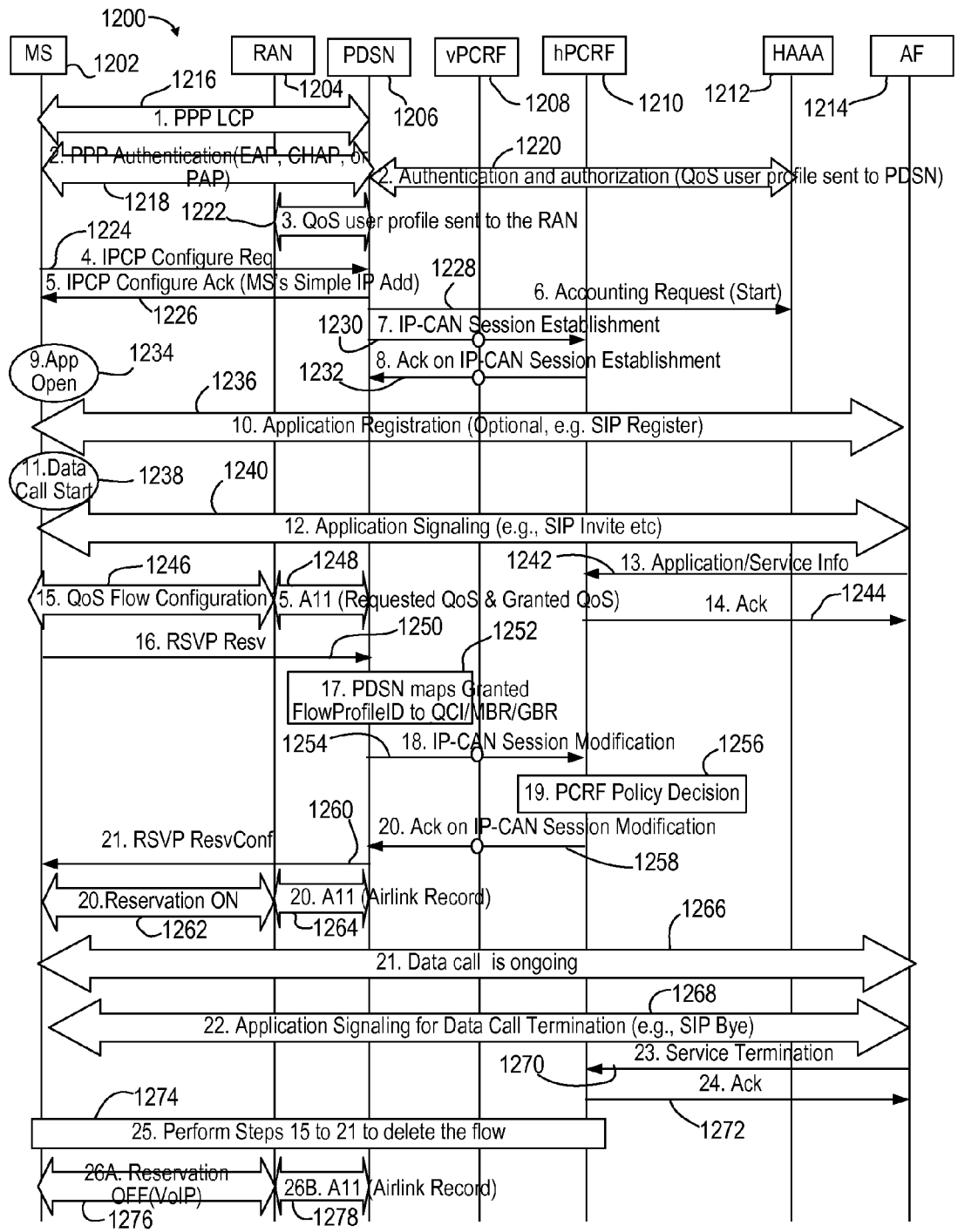
FIG. 12 illustrates a call flow without QoS pre-setup for MS-initiated QoS as a third option.

Thus, in FIG. 12, an exemplary call flow 1200 is depicted for option 3 for MS-initiated QoS in HRPD with PCC architecture performed by an MS 1202, RAN 1204, PDSN 1206, vPCRF 1208, hPCRF 1210, HAAA 1212 and AF 1214. At step 1, MS 1202 performs PPP LCP with PDSN 1206 (block 1216). In step 2, the MS 1202 and PDSN 1206 communicate PPP authentication, which can be for instance EAP, CHAP, and PAP (block 1218). Authentication and authorization (QoS user profile) is sent from HAAA 1212 to PDSN 1206 (block 1220). In step 3, the PDSN 1206 sends the QoS user profile to RAN 1204 (block 1222). In step 4, the MS 1202 sends an IPCP Configuration Request to the PDSN 1206 (block 1224). In step 5, the PDSN 1206 sends an IPCP Configure Ack (MS's Simple IP Add) to the MS 1202 (block 1226). In step 6, the PDSN 1206 sends an Accounting Request (Start) to the HAAA 1212 (block 1228). In step 7, the PDSN 1206 sends IP-CAN Session Establishment to hPCRF 1210 (block 1230). In step 8, the hPCRF 1210 sends Ack on IP-CAN Establishment to the PDSN 1206 (block 1232). In step 9, the MS 1202 opens an application (block 1234). In step 10, Application Registration (Optional, e.g., SIP Register) is performed between MS 1202 and AF 1214 (block 1236). In step 11, a user uses MS 1202 to start a data call (block 1238). In step 12, Application Signaling (e.g., SIP invite, etc.) occurs between MS 1202 and AF 1214 (block 1240). In step 13, AF sends Application/Service Information to hPCRF 1210 (block 1242). In step 14, hPCRF 1210 sends Ack to AF 1214 (block 1244). In step 15, the MS 1202 and RAN 1204 communicate QoS Flow Configuration (block 1246). The RAN 1204 and PDSN 1206 communicate via A11 interface (Requested QoS and Granted QoS) (block 1248). In step 16, MS 1202 sends RSVP Resv to PDSN 1206 (block 1250). In step 17, PDSN 1206 maps Granted FlowProfileID to QCI/MBR/GBR (block 1252). In step 18, the PDSN 1206 sends IP-CAN Session Modification to hPCRF 1210 (block 1254). In step 19, hPCRF 1210 performs PCRF Policy Decision (block 1256). In step 20, hPCRF 1210 sends Ack on IP-CAN Session Modification (Gate OFF) to PDSN 1206 (block 1258). In step 21, PDSN 1206 sends RSVP ResvConf to MS 1202 (block 1260). In step 20, MS 1202 sends Reservation ON to RAN 1204 (block 1262). The RAN 1204 and PDSN 1206 communicate via A11 interface (Airlink Record) (block 1264). In step 21, a data call is ongoing between MS 1202 and AF 1214 (block 1266). In step 22, Application Signaling for Data Call Termination (e.g., SIP Bye) occurs between MS 1202 and AF 1214 (block 1268). In step 23, AF 1214 sends Service Termination to hPCRF 1210 (block 1270). In step 24, hPCRF 1280 sends Ack to AF 1214 (block 1272). At step 25, MS 1202 and hPCRF 1210 performs the steps 15-21 to delete the flow (block 74). In step 26A, MS 1202 communicates Reservation OFF (VoIP) with RAN 1204 (block 1276). In step 26B, RAN 1204 communicates via A11 interface (Airlink Record) with PDSN 1206 (block 1278).

A comparison of the three main options (1, 2, and 3) and two sub-options (1.1, 2.1) summarizes the foregoing description.

Option 1 has advantages of a shorter setup delay and no required changes for PCC interface protocols. An issue is presented in that changes to PCRF behavior are needed. In the case of lack of application signaling, the PCRF cannot perform policy control of different user traffic that are not allowed to be used simultaneously Option 1.1 also has an advantage of shorter setup delay. Issues exist in that changes to PDSN and PCRF behavior are needed. Changes to the PCC interface are needed. For optimization case, the MS may use the QoS for other traffic for a short time of period.

Option 2 has an advantage of no changes to PCC interface protocols and PCRF behaviors are needed. Another advantage is shorter set up delay. Issues presented include changes to PDSN behavior needed and initial QoS and PF setup needs to wait for the first data call. For optimization case, the MS may use the QoS for other traffic for a short period of time.

Option 2.1 has an advantage of no changes to PCC interface protocols and PCRF behaviors needed. Another advantage is shorter set up delay. Issues presented include changes to PDSN behavior are needed. The MS may use the QoS for other traffic for a short time of period. The PDSN cannot perform policing based on 5-tuples received from application signaling Option 3 has an advantage of no changes to standard are required and no changes to PDSN/PCRF are needed. Issues presented include long call set up delay. In addition, if it is used for web-browsing type of services, it can cause unnecessary signaling among MS, RAN, PDSN, and PCRF because reservation ON/OFF can occur frequently. Consequently, PF setup/removal can frequently occur depending upon the duration of the dormant timer.

With further reference to call setup delay that occurs without pre-setup QoS, the PF and QoS needs to be established and released for each packet call. Thereby, two portions of delay will be introduced: In an exemplary implementation, HRPD radio session QoS configuration and Packet Filter (PF) establishment through RSVP typically takes a perceivable delay due to PDSN processing and loading. PF establishment and removal for each call per MS will add more loading and process to the PDSN. In eHRPD, the delay will be doubled due to additional QoS check. It should be appreciated that QoS configuration and PF establishment can be performed in parallel.

Method and Apparatus to Turn on Reservation for Network-Initiated QOS in eHRPD and HRPD:

In the current implementation, the RAN will set ReservationKKIdleStateForward/Reverse=0x0, 0x1, or 0x2 based on QoSFlowProfile.

0x0 means the Reservation ON/OFF needs to be sent explicitly;

0x1 means that the Reservation is automatically turned OFF when traffic channel is released and Reservation ON is needed when the traffic channel is assigned;

0x2 means the Reservation is automatically turned OFF when traffic channel is released and turned ON when traffic channel is assigned.

For UE-initiated QoS, the UE will generally send Reservation ON (OFF) based on application and ReservationKKIdleStateForward/Reverse Value. UE can request ReservationKKIdleStateForward/Reverse Value and RAN can decide based on UE's request or based on QoSFlowProfile. However, it is not clear when should the reservation should be turned on and off for network-initiated QoS. Generally, the current assumption is that the UE will send Reservation ON when it receives RSVP to add flow and send Reservation OFF when it receives RSVP to delete flow. One can reference a corresponding section in 3GPP2 X.50057 V2.0 and would appreciate that there is no stage 3 requirement for it, though. Furthermore, if the UE goes to idle and has not received RSVP with flow delete, it is assumed that the UE will automatically turn on all the network-initiated QoS flows in the device independent of the fact of whether there is data flowing or not for both Forward Link (FL) and Reverse Link (RL) when the UE is assigned with traffic channel. Again there are no stage 3 requirements.

Given the above assumptions then the following disadvantages would be encountered:

The UE needs to take the action to request for Reservation ON/OFF each time that the traffic channel is assigned and released based upon ReservationKKIdleStateForward/Reverse value;

The complexity to the UE is increased;

It is not efficient that when traffic channel is assigned for other purposes or other flows that the reservation with this flow needs to be turned on as well; and It is also not efficient for instances in which the activation fails and hence requiring the UE keep retrying.

To address the foregoing considerations, if the network wants to have a full control for network-initiated QoS, then the RAN should always set the ReservationKKIdleState to 0x2 for network-initiated QoS flows. RAN will always allocate resources for these network-initiated QoS flows when the UE enters a connection state.

If further intelligence is required in network side, then the network can configure the network initiated QoS flows to use ReservationKKIdleState=0x0, 0x1, or 0x2 properly. The information can directly come from the PCRF or HSGW/PDSN can configure it based on network policy and QoS information (for example QCI/GBR/MBR or QoSFlowProfileID). Then HSGW/PDSN can indicate to the RAN directly through A11 signaling, or the HSGW/PDSN can indicate to the MS through RSVP message and then the MS indicate to the RAN through air interface signaling. The network can manage turning on and off of the QoS flow efficiently and not allocate resources for all the network-initiated QoS flows that are currently configured in the UE.

In summary, the network controls setting configuration and turning on or off of the reservation of a QoS flow. The PCRF will indicate to the HSGW/PDSN through the A11 signaling, or through RSVP message (then to the RAN from the MS through air interface signaling). The RAN can set a proper value of ReservationKKIdleState and turn on Reservation ON/OFF accordingly.

Figure 13:
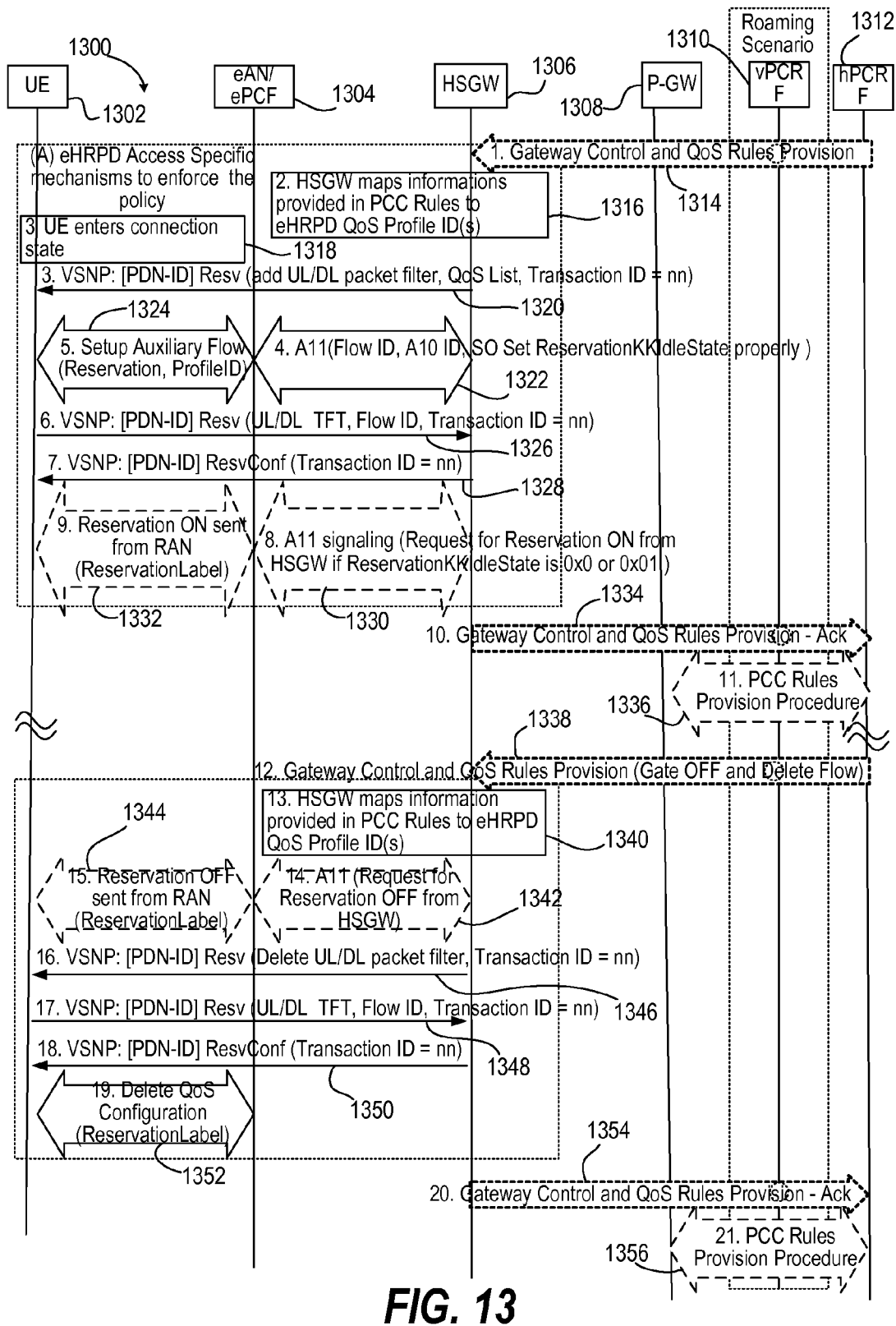
FIG. 13 illustrates a call flow for network-initiated QoS.

In FIG. 13, an exemplary call flow 1300 is depicted for network-initiated QoS (Option 1) performed by UE 1302, eAN/ePCF 1304, HSGW 1306, P-GW 1308, vPCRF (for a roaming scenario) 1310, and hPCRF 1312. In step 1, hPCRF 1312 sends Gateway Control and QoS Rules Provision to HSGW 1306 (block 1314). In step 2, HSGW 1306 maps information provided in PCC Rules to eHRPD QoS Profile ID(s). In step 3, UE 1302 enters connection state (block 1318). HSGW 1306 sends VSNP: [PDN-ID] Resv (add UL/DL packet filter, QoS List, Transaction ID=nn) to UE 1302 (block 1320). In step 4, via A11 interface, eAN/ePCF 1304 and HSGW 1306 communicate Flow ID, A10 ID, SO Set ReservationKKIdleState (block 1322). In step 5, communication between UE 1302 and eAN/ePCF 1304 sets up auxiliary flow (reservation, ProfileID) (block 1324). In step 6, UE 1302 sends VSNP: [PDN-ID] Resv (UL/DL TFT, Flow ID, Transaction ID=nn) to eAN/ePCF 1304 (block 1326). In step 7, HSGW 1306 sends VSNP: [PDN-ID] ResvConf (Transaction ID=nn) to UE 1302 (block 1328). In step 8, A11 signaling (Request for Reservation ON) is sent from HSGW 1306 to eAN/ePCF 1304 if ReservationKKIdleState is 0x0 or 0x01 (block 1330). In step 9, 9. eAN/ePCF 1304 sends Reservation ON (ReservationLabel) to UE 1302 (block 1332). In step 10, HSGW 1306 sends Ack for Gateway Control and QoS Rules Provision to hPCRF 1312 (block 1334). In step 11, PCC Rules Provision Procedures occurs between hPCRF 1312 and vPCRF 1310 (block 1336). In step 12, hPCRF 1312 sends Gateway Control and QoS Rules Provision (Gate OFF and Delete Flow) to HSGW 1306 (block 1338). In step 13, HSGW 1306 maps information provided in PCC Rules to eHRPD QoS Profile ID(s) (block 1340). In step 14, HSGW 1306 sends a request via A11 interface for Reservation OFF to eAN/ePCF 1304 (block 1342). In step 15, eAN/ePCF 1304 sends Reservation OFF (ReservationLabel) to UE 1302 (block 1344). In step 16, HSGW 1306 sends VSNP: [PDN-ID] Resv (Delete UL/DL packet filter, Transaction ID=nn) to UE 1302 (block 1346). In step 17, UE 1302 sends VSNP: [PDN-ID] Resv (UL/DL TFT, Flow ID, Transaction ID=nn) to HSGW 1306 (block 1348). In step 18, HSGW 1306 sends VSNP: [PDN-ID] ResvConf (Transaction ID=nn) to UE 1302 (block 1350). In step 19, communication occurs between UE 1302 and eAN/ePCF 1304 for Delete QoS Configuration (block 1352). In step 20, HSGW 1306 sends Ack for Gateway Control and QoS Rules Provision to hPCRF 1312 (block 1354). In step 21, communication occurs between vPCRF 1310 and hPCRF 1312 for PCC Rules Provision Procedures (block 1356).

Figure 14:
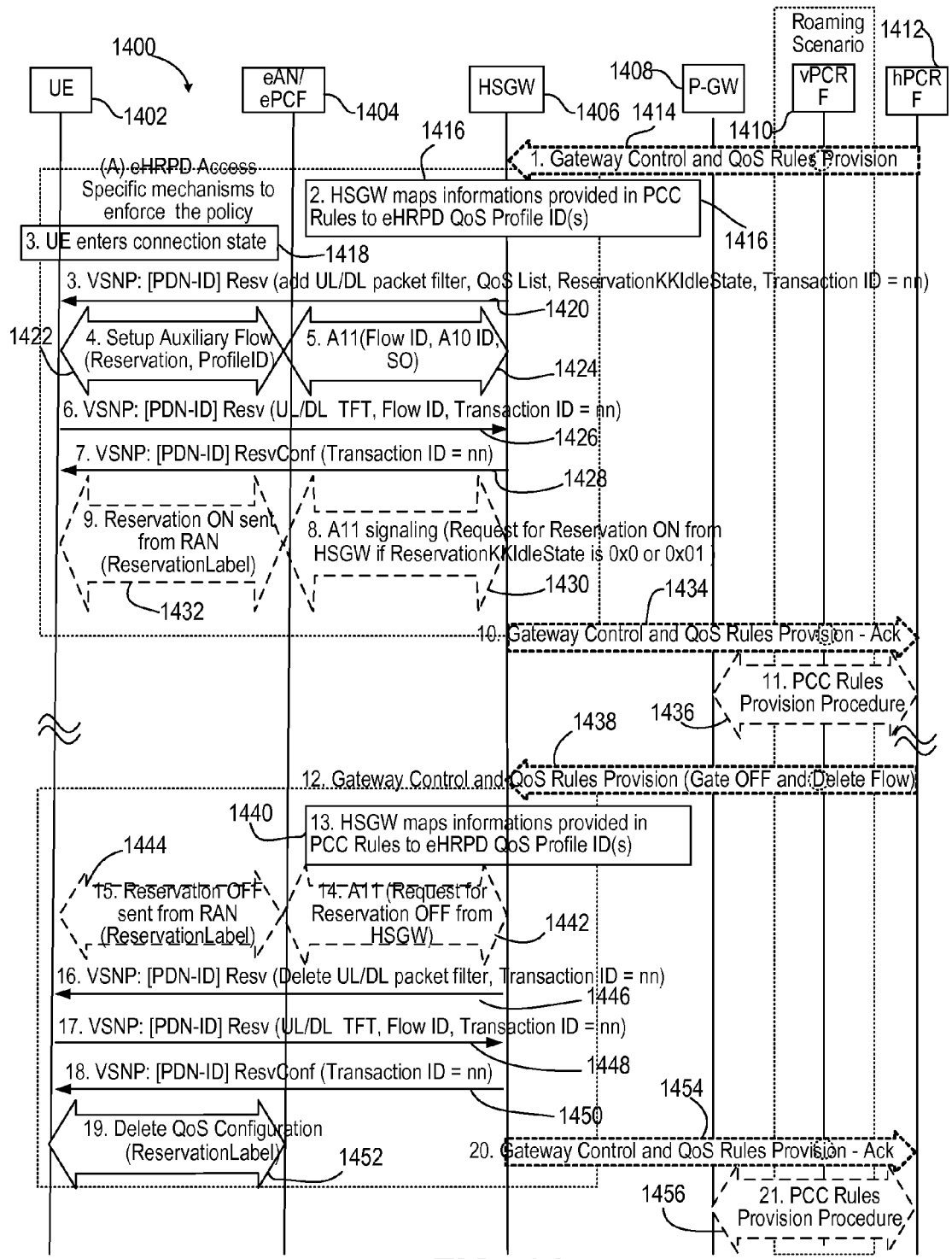
FIG. 14 illustrates an alternative call flow for network-initiated QoS.

In FIG. 14, an exemplary call flow 1400 is depicted for network-initiated QoS (Option 2) performed by UE 1402, eAN/ePCF 1404, HSGW 1406, P-GW 1408, vPCRF (for a roaming scenario) 1410, and hPCRF 1412. In step 1, hPCRF 1412 sends Gateway Control and QoS Rules Provision to HSGW 1406 (block 1414). In step 2, HSGW 1406 maps information provided in PCC Rules to eHRPD QoS Profile ID(s). In step 3, UE 1402 enters connection state (block 1418). HSGW 1406 sends VSNP: [PDN-ID] Resv (add UL/DL packet filter, QoS List, ReservationKKIdleState, Transaction ID=nn) to UE 1402 (block 1420). In step 4, communication between UE 1402 and eAN/ePCF 1404 sets up auxiliary flow (reservation, ProfileID) (block 1424). In step 5, via A11 interface, eAN/ePCF 1404 and HSGW 1406 communicate Flow ID, A10 ID, SO (block 1422). In step 6, UE 1402 sends VSNP: [PDN-ID] Resv (UL/DL TFT, Flow ID, Transaction ID=nn) to eAN/ePCF 1404 (block 1426). In step 7, HSGW 1406 sends VSNP: [PDN-ID] ResvConf (Transaction ID=nn) to UE 1402 (block 1428). In step 8, A11 signaling (Request for Reservation ON) is sent from HSGW 1406 to eAN/ePCF 1404 if ReservationKKIdleState is 0x0 or 0x01 (block 1430). In step 9, 9. eAN/ePCF 1404 sends Reservation ON (ReservationLabel) to UE 1402 (block 1432). In step 10, HSGW 1406 sends Ack for Gateway Control and QoS Rules Provision to hPCRF 1412 (block 1434). In step 11, PCC Rules Provision Procedures occurs between hPCRF 1412 and vPCRF 1410 (block 1436). In step 12, hPCRF 1412 sends Gateway Control and QoS Rules Provision (Gate OFF and Delete Flow) to HSGW 1406 (block 1438). In step 13, HSGW 1406 maps information provided in PCC Rules to eHRPD QoS Profile ID(s) (block 1440). In step 14, HSGW 1406 sends a request via A11 interface for Reservation OFF to eAN/ePCF 1404 (block 1442). In step 15, eAN/ePCF 1404 sends Reservation OFF (ReservationLabel) to UE 1402 (block 1444). In step 16, HSGW 1406 sends VSNP: [PDN-ID] Resv (Delete UL/DL packet filter, Transaction ID=nn) to UE 1402 (block 1446). In step 17, UE 1402 sends VSNP: [PDN-ID] Resv (UL/DL TFT, Flow ID, Transaction ID=nn) to HSGW 1406 (block 1448). In step 18, HSGW 1406 sends VSNP: [PDN-ID] ResvConf (Transaction ID=nn) to UE 1402 (block 1450). In step 19, communication occurs between UE 1402 and eAN/ePCF 1404 for Delete QoS Configuration (block 1452). In step 20, HSGW 1406 sends Ack for Gateway Control and QoS Rules Provision to hPCRF 1412 (block 1454). In step 21, communication occurs between vPCRF 1410 and hPCRF 1412 for PCC Rules Provision Procedures (block 1456).

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 15:
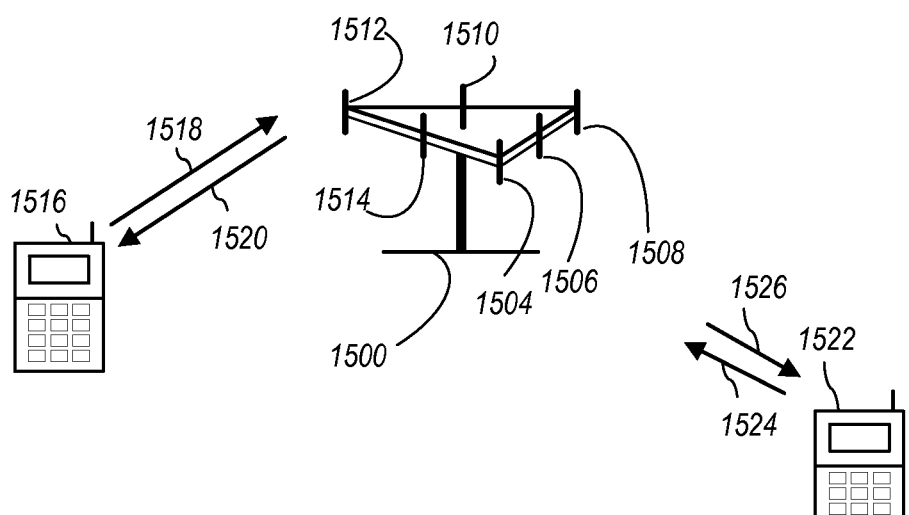
FIG. 15 illustrates a schematic diagram of a multiple access wireless communication system.

Referring to FIG. 15, a multiple access wireless communication system according to one aspect is illustrated. An access point (AP) 1500 includes multiple antenna groups, one including 1504 and 1506, another including 1508 and 1510, and an additional including 1512 and 1514. In FIG. 15, only two antennas are shown for each antenna group, however, more or fewer antennas may be utilized for each antenna group. Access terminal (AT) 1516 is in communication with antennas 1512 and 1514, where antennas 1512 and 1514 transmit information to access terminal 1516 over forward link 1520 and receive information from access terminal 1516 over reverse link 1518. Access terminal 1522 is in communication with antennas 1506 and 1508, where antennas 1506 and 1508 transmit information to access terminal 1522 over forward link 1526 and receive information from access terminal 1522 over reverse link 1524. In a FDD system, communication links 1518, 1520, 1524 and 1526 may use different frequencies for communication. For example, forward link 1520 may use a different frequency then that used by reverse link 1518.

Each group of antennas and/or the area in which they are designed to communicate is often referred to as a sector of the access point 400. In the aspect, antenna groups each are designed to communicate to access terminals 1516 and 1522 in a sector of the areas covered by access point 1500.

In communication over forward links 1520 and 1526, the transmitting antennas of access point 1500 utilize beam forming in order to improve the signal-to-noise ratio of forward links for the different access terminals 1516 and 1522. Also, an access point using beam forming to transmit to access terminals scattered randomly through its coverage causes less interference to access terminals in neighboring cells than an access point transmitting through a single antenna to all of its access terminals.

An access point 1500 may be a fixed station used for communicating with the terminals and may also be referred to as an access point, a Node B, or some other terminology. An access terminal 1516 and 1522 may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 16:
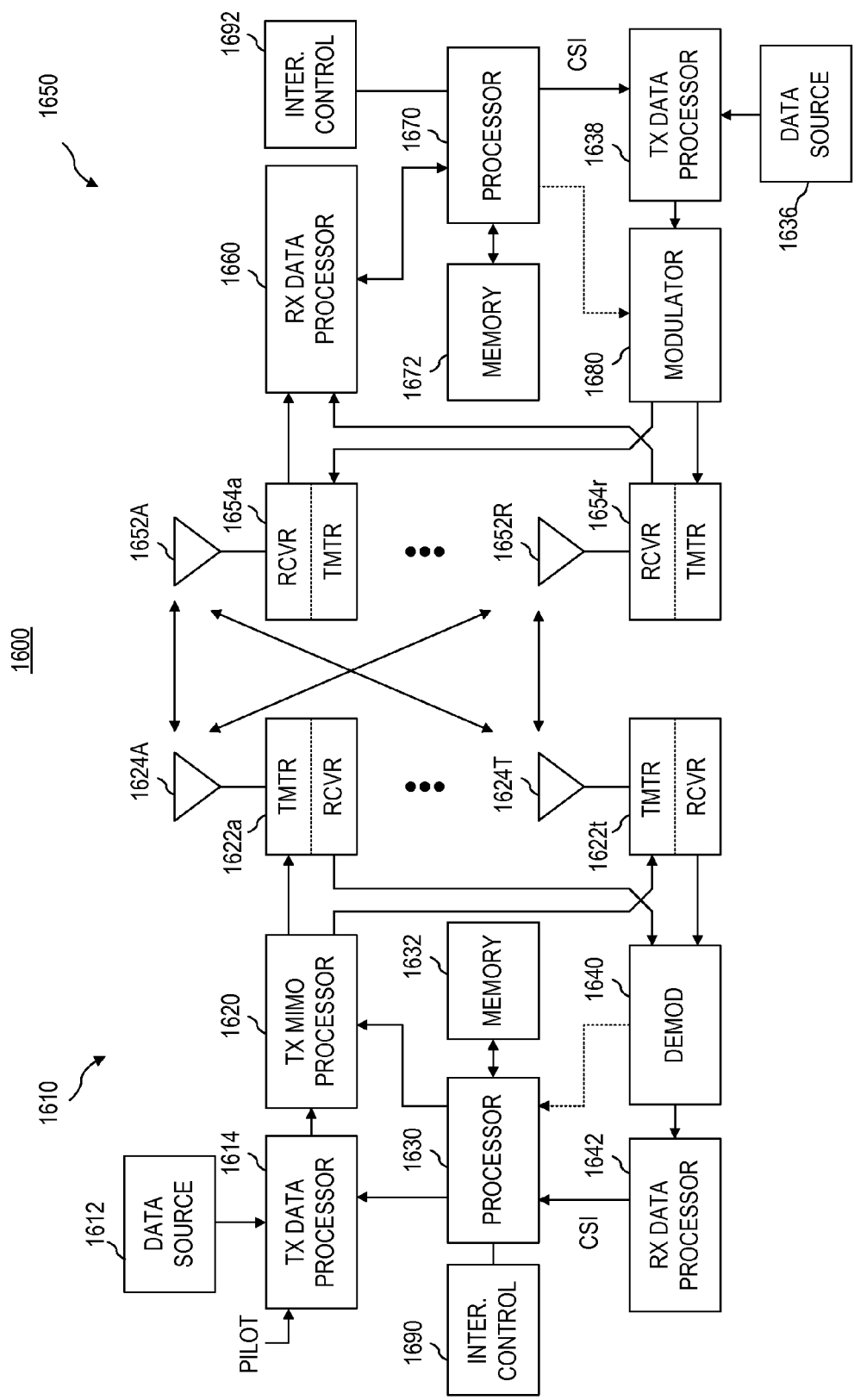
FIG. 16 illustrates a schematic diagram of several sample components that may be employed to facilitate communication between nodes.

The teachings herein may be incorporated into a node (e.g., a device) employing various components for communicating with at least one other node. FIG. 16 depicts several sample components that may be employed to facilitate communication between nodes. Specifically, FIG. 16 illustrates a wireless device 1610 (e.g., an access point) and a wireless device 1650 (e.g., an access terminal) of a MIMO system 1600. At the device 1610, traffic data for a number of data streams is provided from a data source 1612 to a transmit ("TX") data processor 1614.

In some aspects, each data stream is transmitted over a respective transmit antenna. The TX data processor 1614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers ("XCVR") 1622a through 1622t that each has a transmitter (TMTR) and receiver (RCVR). In some aspects, the TX MIMO processor 1620 applies beam-forming weights to the symbols of the data streams and to the antenna from which the symbol is being transmitted.

Each transceiver 1622a-1622t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622a through 1622t are then transmitted from $N_T$ antennas 1624a through 1624t, respectively.

At the device 1650, the transmitted modulated signals are received by $N_R$ antennas 1652a through 1652r and the received signal from each antenna 1652a-1652r is provided to a respective transceiver ("XCVR") 1654a through 1654r. Each transceiver 1654a-1654r conditions (e.g., filters, amplifies, and downconverts) a respective received signal, digitizes the conditioned signal to provide samples, and further processes the samples to provide a corresponding "received" symbol stream.

A receive ("RX") data processor 1660 then receives and processes the $N_R$ received symbol streams from $N_R$ transceivers 1654a-1654r based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which pre-coding matrix to use. The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654a through 1654r, and transmitted back to the device 1610.

At the device 1610, the modulated signals from the device 1650 are received by the antennas 1624a-1624t, conditioned by the transceivers 1622a-1622t, demodulated by a demodulator ("DEMOD") 1640, and processed by a RX data processor 1642 to extract the reverse link message transmitted by the device 1650. The processor 1630 then determines which pre-coding matrix to use for determining the beam-forming weights then processes the extracted message.

FIG. 16 also illustrates that the communication components may include one or more components that perform interference control operations. For example, an interference ("INTER.") control component 1690 may cooperate with the processor 1630 and/or other components of the device 1610 to send/receive signals to/from another device (e.g., device 1650). Similarly, an interference control component 1692 may cooperate with the processor 1670 and/or other components of the device 1650 to send/receive signals to/from another device (e.g., device 1610). It should be appreciated that for each device 1610 and 1650 the functionality of two or more of the described components may be provided by a single component. For example, a single processing component may provide the functionality of the interference control component 1690 and the processor 1630 and a single processing component may provide the functionality of the interference control component 1692 and the processor 1670.

Figure 17:
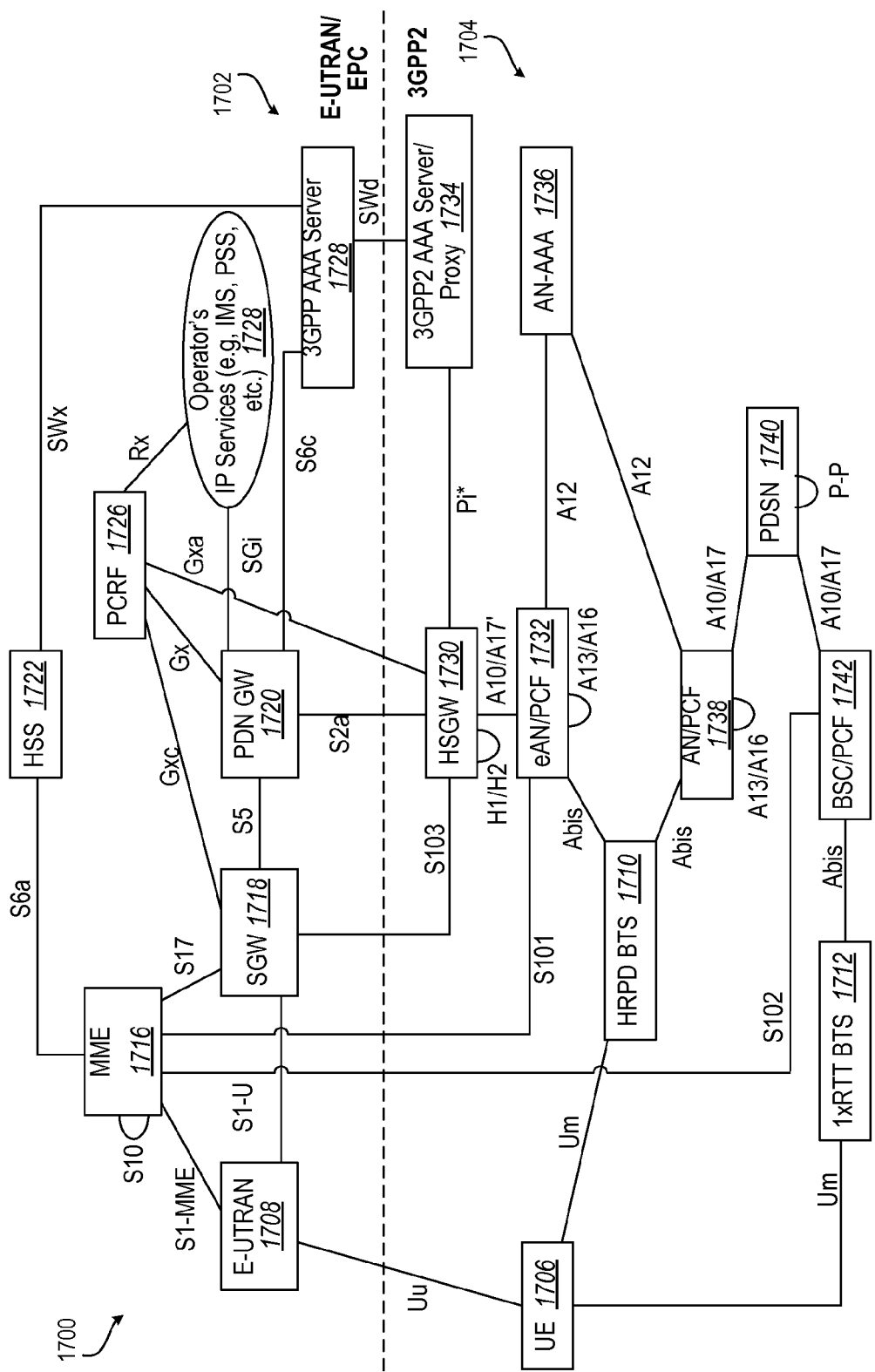
FIG. 17 illustrates a wireless communication system configured to support a number of users.

FIG. 17 illustrates a wireless communication system 1700, configured to support a number of users, in which the teachings herein may be implemented. The system 1700 provides communication for multiple cells 1702, such as, for example, macro cells 1702a-1702g, with each cell being serviced by a corresponding access node 1704 (e.g., access nodes 1704a-1704g). As shown in FIG. 17, access terminals 1706 (e.g., access terminals 1706a-1706l) may be dispersed at various locations throughout the system over time. Each access terminal 1706 may communicate with one or more access nodes 1704 on a forward link ("FL") and/or a reverse link ("RL") at a given moment, depending upon whether the access terminal 1706 is active and whether it is in soft handoff, for example. The wireless communication system 1700 may provide service over a large geographic region. For example, macro cells 1702a-1702g may cover a few blocks in a neighborhood.

In FIG. 17, a communication system 1700 is depicted with an Evolved Universal Terrestrial Radio Access Network (E-UTRAN) network/Evolved Packet Core (EPC) network 1702 (i.e., GSM (Global System for Mobile Communications) or WCDMA (Wideband Code Division Multiple Access)) and a 3GPP2 network 1704 for providing coverage to a mobile device, depicted as UE 1706. The 3rd Generation Partnership Project 2 (3GPP2) is a collaboration between telecommunications associations to make a globally applicable third generation (3G) mobile phone system specification within the scope of the ITU's IMT-2000 project. In practice, 3GPP2 is the standardization group for CDMA2000, the set of 3G standards based on earlier 2G CDMA technology. 3GPP2 should not be confused with 3GPP, which specifies standards for another 3G technology known as UMTS.

The LTE technology is a revolutionary upgrade of 3G systems including WCDMA and CDMA2000. The evolution path from 2G/3G systems to LTE is basically by realizing interworking and seamless handover between systems to migrate the existing network at a low cost. System Architecture Evolution (aka SAE) is the core network architecture of 3GPP's LTE wireless communication standard. SAE is the evolution of the General Packet Radio Service (GPRS) Core Network, with some differences: (1) simplified architecture; (2) A11 IP Network (AIPN); and (3) support for higher throughput and lower latency radio access networks (RANs) support for, and mobility between, multiple heterogeneous RANs, including legacy systems as GPRS, but also non-3GPP systems (say WiMAX).

The evolved RAN for LTE consists of a single node, i.e., an evolved Base Node ("eNodeB" or "eNB") that interfaces with a UE 1706. The eNB is depicted as an E-UTRAN 1708 for the E-UTRAN/EPC network 1702. The eNB hosts the PHYsical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated Uplink (UL) Quality of Service (QoS), cell information broadcast, ciphering/deciphering of user and control plane data, and compression/decompression of Downlink/Uplink (DL/UL) user plane packet headers.

Overall, three different Radio Access Technologies (RATs) are depicted for radio access to the UE 1706. The E-UTRAN 1708 has a Uu external radio interface (logical interface) to the UE 1706. On the 3GPP2 network 1704, both a HRPD Base Transceiver System (BTS) 1710 and a 1xRTT (Radio Transmission Technology) BTS 1712 can have a Um external radio interface to the UE 1706. Examples are Uu or Um to the UE 1706 for 3GPP systems and Um for 3GPP2 systems (i.e., CDMA). The external interface to the UE 1706 transports user data and signaling data over an air interface 1714.

The main component of the SAE architecture is the EPC 1702, also known as SAE Core. The EPC 1702 serves as equivalent of GPRS networks via subcomponents of a Mobility Management Entity (MME) 1716, Serving Gateway (SGW) 1718 and PDN Gateway 1720.

The MME 1716 is the key control-node for the LTE access-network, depicted as the E-UTRAN 1708. It is responsible for idle mode UE tracking and paging procedure including retransmissions. It is involved in the bearer activation/deactivation process and is also responsible for choosing the SGW 1718 for a UE 1706 at the initial attach and at time of intra-LTE handover involving Core Network (CN) node relocation. It is responsible for authenticating the user (by interacting with the HSS). The Non-Access Stratum (NAS) signaling terminates at the MME 1716 and it is also responsible for generation and allocation of temporary identities to UEs 1706. It checks the authorization of the UE 1706 to camp on the service provider's Public Land Mobile Network (PLMN) and enforces UE roaming restrictions. The MME 1716 is the termination point in the network for ciphering/integrity protection for NAS signaling and handles the security key management. Lawful interception of signaling is also supported by the MME 1716. The MME 1716 also provides the control plane function for mobility between LTE and 2G/3G access networks with the S3 interface terminating at the MME 1716 from the SGSN (not depicted). The MME 1716 also terminates the S6a interface towards the Home Subscriber Server (HSS) 1722 for roaming UEs.

The SGW 1718 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs 1706, the SGW 1718 terminates the Downlink (DL) data path and triggers paging when DL data arrives for the UE 1706. It manages and stores UE contexts, e.g., parameters of the Internet Protocol (IP) bearer service, network internal routing information. It also performs replication of the user traffic in case of lawful interception.

The PDN Gateway (PGW) 1720 provides connectivity from the UE 1706 to external packet data networks, depicted as Operator's IP Services 1724, such as IP Multimedia Subsystem (IMS), Packet Switched Services (PSS) etc., by being the point of exit and entry of traffic for the UE 1706. A UE 1706 may have simultaneous connectivity with more than one PGW 1720 for accessing multiple PDNs. The PGW 1720 performs policy enforcement, packet filtering for each user, charging support, lawful Interception and packet screening. Another key role of the PGW 1720 is to act as the anchor for mobility between 3GPP and non-3GPP technologies such as WiMAX and 3GPP2 (CDMA 1x and EvDO).

A key feature of the EPS is the separation of the network entity that performs control-plane functionality (MME 1716) from the network entity that performs bearer-plane functionality (SGW 1718) with a well defined open interface between them (S11). Since E-UTRAN 1708 provides higher bandwidths to enable new services as well as to improve existing ones, separation of MME 1716 from SGW 1718 implies that SGW 1718 can be based on a platform optimized for high bandwidth packet processing, whereas the MME 1716 is based on a platform optimized for signaling transactions. This enables selection of more cost-effective platforms for, as well as independent scaling of, each of these two elements. Service providers can also choose optimized topological locations of SGWs 1718 within the network independent of the locations of MMEs 1716 in order to optimize bandwidth reduce latencies and avoid concentrated points of failure.

An Application Function (AF) is an element offering applications that require the Policy and Charging Control of traffic plane resources (e.g., UMTS Packet Switched (PS) domain/ GPRS domain resources). The AF is depicted as an operator's IP services 1724. One example of an application function is Policy Control and Charging Rules Function (P-CSCF) 1726. The AF can use the Rx reference point to provide session information to the PCRF 1726. The PCRF 1726 is a functional element that encompasses policy control decision and flow based charging control functionalities. The PCRF 1726 provides network control regarding the service data flow detection, gating, QoS and flow based charging (except credit management) towards the Policy and Charging Enforcement Function (PCEF) (not shown). The PCRF receives session and media related information from the AF and informs AF of traffic plane events. The PCRF 1726 may check that the service information provided by the AF is consistent with the operator defined policy rules before storing the service information. The service information shall be used to derive the QoS for the service. The PCRF 1726 may reject the request received from the AF and as a result the PCRF indicates 1726, in the response to the AF, the service information that can be accepted by the PCRF 1726. The PCRF 1726 may use the subscription information as basis for the policy and charging control decisions. The subscription information may apply for both session based and non-session based services. The subscription specific information for each service may contain e.g. max QoS class and max bit rate. If the AF requests it, the PCRF 1726 reports IP-CAN session events (including bearer events and events on AF signaling transport) to the AF via the Rx reference point.

A 3GPP Authentication, Authorization, Accounting (AAA) server 1728 is interfaced via an S6c to the PDN Gateway 1720 and an SWx interface to the HSS 1722.

S1-MME is the reference point for the control plane protocol between E-UTRAN 1708 and MME 1716. The protocol over this reference point is evolved Radio Access Network Application Protocol (eRANAP) and it uses Stream Control Transmission Protocol (SCTP) as the transport protocol.

S1-U reference point between E-UTRAN 1708 and SGW 1718 for the per-bearer user plane tunneling and inter-eNB path switching during handover. The transport protocol over this interface is GPRS Tunneling Protocol-User plane (GTP-U).

S2a provides the user plane with related control and mobility support between trusted non-3GPP IP access and the SGW 1718. S2a is based on Proxy Mobile IP. To enable access via trusted non-3GPP IP accesses that do not support PMIP, S2a also supports Client Mobile IPv4 FA mode.

S2b provides the user plane with related control and mobility support between evolved Packet Data Gateway (ePDG) and the PDN GW. It is based on Proxy Mobile IP.

S2c provides the user plane with related control and mobility support between UE and the PDN GW. This reference point is implemented over trusted and/or untrusted non-3GPP Access and/or 3GPP access. This protocol is based on Client Mobile IP co-located mode.

S3 is the interface between SGSN (not shown) and MME 1716 and it enables user and bearer information exchange for inter 3GPP access network mobility in idle or active state. It is based on Gn reference point as defined between SGSNs.

S4 provides the user plane with related control and mobility support between SGSN and the SGW 1718 and is based on Gn reference point as defined between SGSN and Gateway GPRS Support Node (GGSN) (not shown).

S5 provides user plane tunneling and tunnel management between SGW 1718 and PDN GW 1720. It is used for SGW relocation due to UE mobility and if the SGW needs to connect to a non-collocated PDN GW for the required PDN connectivity.

S6a enables transfer of subscription and authentication data for authenticating/authorizing user access to the evolved system (AAA interface) between MME 1716 and HSS 1722.

S7 provides transfer of (QoS) policy and charging rules from Policy and Charging Rules Function (PCRF) 1726 to Policy and Charging Enforcement Function (PCEF) in the PDN GW 1720. This interface is based on the Gx interface.

S10 is the reference point between MMEs 1716 for MME relocation and MME to MME information transfer.

S11 is the reference point between MME 1716 and SGW 1718.

SGi is the reference point between the PDN GW 1720 and the packet data network 1728.

Packet data network (PDN) 1728 may be an operator-external public or private packet data network or an intra-operator packet data network, e.g. for provision of IMS services. This reference point corresponds to Gi for 2G/3G accesses Rx+. The Rx reference point resides between the Application Function and the PCRF 1726.

The 3GPP2 network 1704 is depicted as including a HSGW 1730, evolved HRPD Access Network/Packet Control Function (eAN/PCF) 1732, 3GPP2 AAA server/proxy 1734, Access Node (AN)-AAA 1736, AN/PCF 1738, Packet Data Serving Node (PDSN) 1740, and Base Station Controller (BSC)/PCF 1742 in addition to the HRPD BTS 1710 and 1xRTT BTS 1712.

In the architecture, several new interfaces including S101, S103 and S2a are introduced to realize the interworking between CDMA2000 HRPD and LTE. Corresponding to the system architecture of LTE, Packet Data Serving Node (PDSN) is split into the HSGW 1730 and PDN GW 1720 while Access Network/Packet Control Function (AN/PCF) 1738 is enhanced into eAN/PCF 1732 to support the three new interfaces. HRPD here is called evolved HRPD (eHRPD).

The E-UTRAN and the 3GPP2 eHRPD network architecture includes the following interfaces:

S101 reference point provides for the signaling interface between the MME 1716 in the 3GPP EPS 1702 and the eAN/ePCF 1732 in the 3GPP2 eHRPD 1704. This S101 reference point provides tunneling of signaling and data between the UE 1706 and the target access network via the source/serving access network. This allows a UE 1706 to tunnel HRPD air interface signaling over the LTE system to make pre-registration and exchange handover signaling messages with the target system before the actual handover, thus realizing a seamless and rapid handover between two systems.

S103 reference point is the bearer interface between the EPC Serving Gateway (SGW) 1718 and the HSGW 1730, which is used to forward the downlink data, minimizing the packet loss during the transfer from LTE to HRPD. The S103 reference point connects the SGW 1720 in the 3GPP EPC 1702 to the HSGW 1730 in the 3GPP2 eHRPD network 1704.

For the interworking between E-UTRAN network 1702 and 3GPP2 eHRPD network 1704, the following reference points are defined:

The H1 reference point carries signaling information between a source HSGW (S-HSGW) and a target HSGW (T-HSGW) for optimized inter-HSGW handoff.

The H2 reference point carries user traffic between a source HSGW (S-HSGW) and a target HSGW (T-HSGW) for optimized inter-HSGW handoff.

The Gxa reference point connects the PCRF 1726 in the 3GPP EPC 1702 to Bearer Binding and Event Reporting Function (BBERF) in the HSGW 1730 in the 3GPP2 eHRPD access network 1704.

The Pi* reference point connects the HSGW 1730 to the 3GPP2 AAA server/proxy 1734.

The S2a reference point connects the PDN Gateway 1720 in the 3GPP EPC 1702 to the HSGW 1730 in the 3GPP2 eHRPD network 1704. This reference point provides the user plane with related control and mobility support between eHRPD access network 1704 and the PGW 1720. S2a provides the user plane with related control and mobility support between trusted non-3GPP IP access (e.g., WiMAX access network) and the 3GPP core network (PDN Gateway 1720). It is defined between the Mobile Access Gateway and Packet Data Gateway. In the case that the Mobile IPv4 is used as S2a protocol, then the WiMAX side of this reference point is terminated by the MIPv4 Foreign Agent function.

S6b is the reference point between PDN Gateway 1720 and 3GPP AAA server/proxy 1734 for mobility related authentication if needed. S6b may also be used to retrieve and request storage of mobility parameters. This reference point may also be used to retrieve static QoS profile for a UE for non-3GPP access in case dynamic Policy and Charging Control (PCC) is not supported. Gx provides transfer of QoS policy and charging rules from PCRF 1726 to Policy and Charging Enforcement Function (PCEF) in the PGW 1720. Gxa provides transfer of QoS policy information from PCRF 1726 to the trusted non-3GPP accesses (ASN GW). Gxc provides transfer of QoS policy information from PCRF 1726 to the SGW 1718.

AN-AAA 1736 communicates with the Radio Network Controller (RNC) (not shown) in the Access Network (AN) to enable authentication and authorization functions to be performed at the AN 1732, 1738. The interface between AN 1732, 1738 and AN-AAA 1736 is known as the A12 interface.

HSGW 1730 provides interconnection between UE 1706 and the 3GPP EPS architecture, including seamless mobility, Policy and Charging Control (PCC) and roaming between LTE and HRPD. The HSGW 1730 is the entity that terminates the eHRPD access network interface from the eAN/ePCF 1732 (i.e., A10/A11 interfaces). The HSGW 1730 routes UE originated or UE terminated packet data traffic. An HSGW 1730 also establishes, maintains and terminates link layer sessions to UEs 1706. The HSGW functionality provides interworking of the UE 1706 with the 3GPP EPS architecture and protocols. This includes support for mobility, policy control and charging (PCC), access authentication, and roaming. The HSGW 1730 supports inter-HSGW handoff as well, using S2a (PMIPv6). The HSGW 1730 supports inter-HSGW handoff with context transfer. The HSGW 1730 may use inter-HSGW handoff without context transfer.

The eAN/PCF 1732 supports the tunneling of HRPD air interface signaling through S101. The enhanced AN/PCF solution adds a Signaling Adaptation Protocol (SAP) in the connection layer.

A10/A11 interface bear the transmission of signaling and data between PCF and PDSN 1740 for maintaining the Base Station System-Base Station Controller (BSS-BCF) A10 connection. The A10 interface bears data while A11 interface bears signaling.

Abis interface uses Abis protocol for interfaces between the BSC (not shown) and the BTS 1710, 1712. It consists of two parts on the application layer: control part (Abisc) and traffic part (Abist), the former converts the Um interface control channel signaling and the latter converts the control over the traffic channel.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for configuring quality of service (QoS) for an access terminal, comprising:
receiving, at a gateway, a request for packet data access for an access terminal;
determining by the gateway, based on establishment of the packet data access, a QoS policy configuration corresponding to an application on the access terminal;
establishing a reservation link with the access terminal separately from the QoS policy configuration; and
initiating activation of the reservation link, wherein the initiating activation of the reservation link includes turning on of reservation for both forward and reverse flows by a radio network in response to an indication from the gateway.

2. The method of claim 1, wherein the initiating activation of the reservation link further comprises receiving initiation of turning on of the reservation link for both forward and reverse flows from the access terminal.

3. The method of claim 1, wherein the gateway is a High Rate Packet Data (HRPD) Serving Gateway (HSGW) or a Packet Data Serving Node (PDSN).

4. The method of claim 3, wherein the initiating activation of the reservation link further comprises:
receiving signaling over an A11 interface to an access network to turn Reservation ON from the HSGW that detected arriving data; and
receiving signaling over the A11 interface to the access network to turn Reservation OFF from the HSGW that detected no arriving data for a period of time.

5. The method of claim 3, wherein the initiating activation of the reservation link further comprises an A11 signaling for activating or deactivating the reservation link from a Policy and Charging Resource Function (PCRF) to the HSGW for Simple Internet Protocol (SIP).

6. The method of claim 3, further comprising continuing to cache a packet filter and the QoS policy configuration at the PDSN or the HSGW subsequent to receiving a rules deletion from a Policy and Charging Resource Function (PCRF) for access terminal initiated QoS.

7. The method of claim 6, further comprising caching the packet filter and the QoS policy configuration on a User Equipment (UE), the PDSN, and the PCRF.

8. The method of claim 6, further comprising indicating a status of the reservation from the PDSN to the PCRF based on information the PDSN gets from an evolved HRPD Access Network/Packet Control Function (eAN/PCF).

9. The method of claim 6, further comprising deleting the packet filter and the QoS policy configuration at the PDSN or the HSGW in response to receiving a request from the access terminal.

10. The method of claim 6, wherein the continuing to cache the packet filter and the QoS policy configuration at the PDSN or the HSGW is in response to using a HRPD type of Radio Access Technology (RAT).

11. The method of claim 1, wherein the initiating activation of the reservation link further comprises initiating activation of the reservation link for forward flow by the access terminal in response to detecting data activity for the forward flow and initiating activation of the reservation link for reverse flow by the network in response to detecting data activity for the reverse flow.

12. The method of claim 1, further comprising:
performing a hand off between a source Radio Access Technology (RAT) and a target RAT; and
activating a reservation link at the target RAT only for a flow active at the source RAT.

13. The method of claim 1, further comprising:
performing a hand off between a source Radio Access Technology (RAT) and a target RAT; and
activating a reservation link at the target RAT only for a network-initiated QoS.

14. The method of claim 1, further comprising dividing a global filter identifier space into a first portion for access terminal initiated QoS and a second portion for network initiated QoS.

15. The method of claim 1, wherein the initiating activation of the reservation link further comprises triggering the access terminal to send Reservation ON in response to a successful Reservation Protocol (RSVP) flow setup initiated by the gateway and triggering the access terminal to send Reservation OFF in response to successful Reservation Protocol (RSVP) flow setup delete initiated by the gateway.

16. A processor module, comprising a hardware, configured to:
receive, at a gateway, a request for packet data access for an access terminal;
determine by the gateway, based on establishment of the packet data access, a QoS policy configuration corresponding to an application on the access terminal;
establish a reservation link with the access terminal separately from the QoS policy configuration; and
initiate activation of the reservation link, wherein the initiating activation of the reservation link includes turning on of reservation for both forward and reverse flows by a radio network in response to an indication from the gateway.

17. A computer program product operable by a gateway in configuring quality of service (QoS) for an access terminal, comprising:
a non-transitory computer-readable medium storing sets of code comprising:
a first set of code for causing a computer to receive, at a gateway, a request for packet data access for an access terminal;
a second set of code for causing the computer to determine, by the gateway, based on establishment of the packet data access, a QoS policy configuration corresponding to an application on the access terminal;
a third set of code for causing the computer to establish a reservation link with the access terminal separately from the QoS policy configuration; and
a fourth set of code for causing the computer to initiate activation of the reservation link, wherein the initiating activation of the reservation link includes turning on of reservation for both forward and reverse flows by a radio network in response to an indication from the gateway.

18. An apparatus operable by a gateway network in configuring quality of service (QoS) for an access terminal, comprising:
means for receiving, at a gateway, a request for packet data access for an access terminal;
means for determining by the gateway, based on establishment of the packet data access, a QoS policy configuration corresponding to an application on the access terminal;
means for establishing a reservation link with the access terminal separately from the QoS policy configuration; and
means for initiating activation of the reservation link, wherein the initiating activation of the reservation link includes turning on of reservation for both forward and reverse flows by a radio network in response to an indication from the gateway.

19. An apparatus operable by a gateway in configuring quality of service (QoS) for an access terminal, comprising:
a transceiver for receiving, at a gateway, a request for packet data access for an access terminal;
a computing platform for determining by the gateway, based on establishment of the packet data access, a QoS policy configuration corresponding to an application on the access terminal;
a network interface for establishing a reservation link with the access terminal separately from the QoS policy configuration; and
the transceiver further configured for initiating activation of the reservation link, wherein the initiating activation of the reservation link includes turning on of reservation for both forward and reverse flow by a radio network in response to an indication from the gateway.

20. The apparatus of claim 19, wherein the transceiver is further configured for the initiating activation of the reservation link by receiving initiation of turning on of the reservation link for both forward and reverse flows from the access terminal.

21. The apparatus of claim 19, wherein the gateway is a High Rate Packet Data (HRPD) Serving Gateway (HSGW) or a Packet Data Serving Node (PDSN).

22. The apparatus of claim 21, wherein the transceiver is further configured for initiating the activation of the reservation link by:
receiving signaling over an A11 interface to an access network to turn Reservation ON from the HSGW that detected arriving data; and
receiving signaling over the A11 interface to the access network to turn Reservation OFF from the HSGW that detected no arriving data for a period of time.

23. The apparatus of claim 21, wherein the transceiver is further configured for the initiating activation of the reservation link in response to the network interface participating in A11 signaling for activating or deactivating the reservation link from a Policy and Charging Resource Function (PCRF) to the HSGW for Simple Internet Protocol (SIP).

24. The apparatus of claim 21, wherein the computing platform is further configured for continuing to cache a packet filter and the QoS policy configuration at the PDSN or the HSGW subsequent to receiving a rules deletion from a Policy and Charging Resource Function (PCRF) for access terminal initiated QoS.

25. The apparatus of claim 24, wherein the computing platform is further configured for caching the packet filter and the QoS policy configuration on a User Equipment (UE), the PDSN, and the PCRF.

26. The apparatus of claim 24, wherein the network interface is further configured for indicating a status of the reservation from the PDSN to the PCRF based on information the PDSN gets from an evolved HRPD Access Network/Packet Control Function (eAN/PCF).

27. The apparatus of claim 24, wherein the computing platform is further configured for deleting the packet filter and the QoS policy configuration at the PDSN or the HSGW in response to receiving a request from the access terminal.

28. The apparatus of claim 24, wherein the computing platform is further configured for continuing to cache the packet filter and the QoS policy configuration at the PDSN or the HSGW in response to using a HRPD type of Radio Access Technology (RAT).

29. The apparatus of claim 19, wherein the transceiver is further configured for the initiating activation of the reservation link by receiving initiating activation of the reservation link for forward flow by the access terminal in response to detecting data activity for the forward flow and transmitting initiating activation of the reservation link for reverse flow by the network in response to detecting data activity for the reverse flow.

30. The apparatus of claim 19, wherein the network interface is further configured for performing a hand off between a source Radio Access Technology (RAT) and a target RAT, and for activating a reservation link at the target RAT only for a flow active at the source RAT.

31. The apparatus of claim 19, wherein the network interface is further configured for performing a hand off between a source Radio Access Technology (RAT) and a target RAT, and for activating a reservation link at the target RAT only for a network-initiated QoS.

32. The apparatus of claim 19, wherein the computing platform is further configured for dividing a global filter identifier space into a first portion for access terminal initiated QoS and a second portion for network initiated QoS.

33. The apparatus of claim 19, wherein the transceiver is further configured for the initiating activation of the reservation link by triggering the access terminal to send Reservation ON in response to a successful Reservation Protocol (RSVP) flow setup initiated by the gateway and triggering the access terminal to send Reservation OFF in response to successful Reservation Protocol (RSVP) flow setup delete initiated by the gateway.

34. A method for requesting Quality of Service (QoS) by an access terminal, comprising:
transmitting to a gateway, a request for packet data access for an access terminal to prompt the network to determine based on establishment of the packet data access a QoS policy configuration corresponding to an application on the access terminal;
establishing a reservation link with the gateway separately from the QoS policy configuration; and
initiating activation of the reservation link, wherein the initiating activation of the reservation link includes turning on of reservation for both forward and reverse flows by a radio network in response to an indication from the gateway.

35. The method of claim 34, wherein the initiating activation of the reservation link further comprises transmitting initiation of turning on of the reservation link for both forward and reverse flows from the access terminal.

36. The method of claim 34, wherein the gateway is a High Rate Packet Data (HRPD) Serving Gateway (HSGW) or a Packet Data Serving Node (PDSN).

37. The method of claim 36, wherein the initiating activation of the reservation link further comprises:
receiving signaling over an A11 interface to an access network to turn Reservation ON from the HSGW that detected arriving data; and
receiving signaling over the A11 interface to the access network to turn Reservation OFF from the HSGW that detected no arriving data for a period of time.

38. The method of claim 36, wherein the initiating activation of the reservation link further comprises an A11 signaling for activating or deactivating the reservation link from a Policy and Charging Resource Function (PCRF) to the HSGW for Simple Internet Protocol (SIP).

39. The method of claim 36, further comprising initiating QoS by the access terminal to prompt continuing to cache a packet filter and the QoS policy configuration at the PDSN or the HSGW subsequent to receiving a rules deletion from a Policy and Charging Resource Function (PCRF).

40. The method of claim 39, further comprising caching the packet filter and the QoS policy configuration on a User Equipment (UE), the PDSN, and the PCRF.

41. The method of claim 39, wherein a status of reservation is indicated from the PDSN to the PCRF based on information the PDSN gets from an evolved HRPD Access Network/Packet Control Function (eAN/PCF).

42. The method of claim 39, further comprising sending a request from the access terminal to delete the packet filter and the QoS policy configuration at the PDSN or the HSGW.

43. The method of claim 39, wherein continuing to cache the packet filter and the QoS policy configuration at the PDSN or the HSGW is in response to using a HRPD type of Radio Access Technology (RAT).

44. The method of claim 34, wherein the initiating activation of the reservation link further comprises initiating activation of the reservation link for forward flow by the access terminal in response to detecting data activity for the forward flow and initiating activation of the reservation link for reverse flow by the network in response to detecting data activity for the reverse flow.

45. The method of claim 34, further comprising participating in a hand off between a source Radio Access Technology (RAT) and a target RAT, wherein a reservation link is activated at the target RAT only for a flow active at the source RAT.

46. The method of claim 34, further comprising participating in a hand off between a source Radio Access Technology (RAT) and a target RAT wherein a reservation link is activated at the target RAT only for a network-initiated QoS.

47. The method of claim 34, further comprising using a global filter identifier space divided into a first portion for access terminal initiated QoS and a second portion for network initiated QoS.

48. The method of claim 34, wherein the initiating activation of the reservation link further comprises receiving triggering at the access terminal and sending Reservation ON in response to successful Reservation Protocol (RSVP) flow setup initiated by the gateway and receiving triggering at the access terminal and sending Reservation OFF in response to successful Reservation Protocol (RSVP) flow setup delete initiated by the gateway.

49. A processor module, comprising a hardware, configured to:
transmit to a gateway, a request for packet data access for an access terminal to prompt the gateway to determine based on establishment of the packet data access a QoS policy configuration corresponding to an application on the access terminal;

establish a reservation link with the gateway separately from the QoS policy configuration; and initiate activation of the reservation link, wherein the initiate activation of the reservation link includes turning on of reservation for both forward and reverse flows by a radio network in response to an indication from the gateway.

50. A computer program product is provided that is operable by an access terminal in requesting Quality of Service (QoS), comprising:

a non-transitory computer-readable medium storing sets of codes comprising:

a first set of codes for causing a computer to transmit to a gateway, a request for packet data access for an access terminal to prompt the network to determine based on establishment of the packet data access a QoS policy configuration corresponding to an application on the access terminal;

a second set of codes for causing the computer to establish a reservation link with the gateway separately from the QoS policy configuration; and a third set of codes for causing the computer to initiate activation of the reservation link, wherein the initiating activation of the reservation link includes turning on of reservation for both forward and reverse flows by a radio network in response to an indication from the gateway.

51. An apparatus is provided that is operable by an access terminal in requesting Quality of Service (QoS), comprising:

means for transmitting to a gateway, a request for packet data access for an access terminal to prompt the network to determine based on establishment of the packet data access a QoS policy configuration corresponding to an application on the access terminal;

means for establishing a reservation link with the gateway separately from the QoS policy configuration; and means for initiating activation of the reservation link, wherein the initiating activation of the reservation link includes turning on of reservation for both forward and reverse flows by a radio network in response to an indication from the gateway.

52. An apparatus is provided that is operable by an access terminal in requesting QoS, comprising:

a transceiver for transmitting to a gateway, a request for packet data access for an access terminal to prompt the network to determine based on establishment of the packet data access a QoS policy configuration corresponding to an application on the access terminal; and a computing platform, via the transceiver, for establishing a reservation link with the network separately from the QoS policy configuration, and for initiating activation of the reservation link, wherein the initiating activation of the reservation link includes turning on of a reservation for both forward and reverse flows by a radio network in response to an indication from the gateway.

53. The apparatus of claim 52, wherein the initiating activation of the reservation link further comprises transmitting initiation of turning on of the reservation link for both forward and reverse flows from the access terminal.

54. The apparatus of claim 52, wherein the gateway is a High Rate Packet Data (HRPD) Serving Gateway (HSGW) or a Packet Data Serving Node (PDSN).

55. The apparatus of claim 54, wherein the initiating activation of the reservation link further comprises:

receiving signaling over an A11 interface to an access network to turn Reservation ON from the HSGW that detected arriving data; and receiving signaling over the an A11 interface to the access network to turn Reservation OFF from the HSGW that detected no arriving data for a period of time.

56. The apparatus of claim 54, wherein the initiating activation of the reservation link further comprises an A11 signaling for activating or deactivating the reservation link from a Policy and Charging Resource Function (PCRF) to the HSGW for Simple Internet Protocol (SIP).

57. The apparatus of claim 54, further comprising initiating QoS by the access terminal to prompt continuing to cache a packet filter and the QoS policy configuration at the PDSN or the HSGW subsequent to receiving a rules deletion from a Policy and Charging Resource Function (PCRF).

58. The apparatus of claim 57, further comprising caching the packet filter and the QoS policy configuration on a User Equipment (UE), the PDSN, and the PCRF.

59. The apparatus of claim 57, wherein a status of reservation is indicated from the PDSN to the PCRF based on information the PDSN gets from an evolved HRPD Access Network/Packet Control Function (eAN/PCF).

60. The apparatus of claim 57, further comprising sending a request from the access terminal to delete the packet filter and the QoS policy configuration at the PDSN or the HSGW.

61. The apparatus of claim 57, wherein continuing to cache the packet filter and the QoS policy configuration at the PDSN or the HSGW is in response to using a HRPD type of Radio Access Technology (RAT).

62. The apparatus of claim 52, wherein the initiating activation of the reservation link further comprises initiating activation of the reservation link for forward flow by the access terminal in response to detecting data activity for the forward flow and initiating activation of the reservation link for reverse flow by the network in response to detecting data activity for the reverse flow.

63. The apparatus of claim 52, further comprising participating in a hand off between a source Radio Access Technology (RAT) and a target RAT, wherein a reservation link is activated at the target RAT only for a flow active at the source RAT.

64. The apparatus of claim 52, further comprising participating in a hand off between a source Radio Access Technology (RAT) and a target RAT wherein a reservation link is activated at the target RAT only for a network-initiated QoS.

65. The apparatus of claim 52, further comprising using a global filter identifier space divided into a first portion for access terminal initiated QoS and a second portion for network initiated QoS.

66. The apparatus of claim 52, wherein the initiating activation of the reservation link further comprises receiving triggering at the access terminal and sending Reservation ON in response to successful Reservation Protocol (RSVP) flow setup initiated by the network and receiving triggering at the access terminal and sending Reservation OFF in response to successful Reservation Protocol (RSVP) flow setup delete initiated by the network.

* * * * *